United States Patent
Buchanan et al.

(10) Patent No.: US 11,536,083 B2
(45) Date of Patent: Dec. 27, 2022

(54) AUTOMATED SPACER PROCESSING SYSTEMS AND METHODS

(71) Applicant: Cardinal IG Company, Eden Prairie, MN (US)

(72) Inventors: Robert C. Buchanan, Spring Green, WI (US); Michael J. Milewski, Poynette, WI (US); Daniel Todd Butson, Pardeeville, WI (US)

(73) Assignee: CARDINAL IG COMPANY, Minneapolis, MN (US)

( * ) Notice: Subject to any disclaimer, the term of this patent is extended or adjusted under 35 U.S.C. 154(b) by 19 days.

(21) Appl. No.: 16/882,107

(22) Filed: May 22, 2020

(65) Prior Publication Data

US 2021/0363813 A1 Nov. 25, 2021

(51) Int. Cl.
*E06B 3/673* (2006.01)
*B25J 9/00* (2006.01)
(Continued)

(52) U.S. Cl.
CPC ......... *E06B 3/67326* (2013.01); *B25J 9/0093* (2013.01); *B25J 9/1682* (2013.01); *B25J 9/1687* (2013.01); *B25J 15/0028* (2013.01); *B25J 15/0061* (2013.01); *B29C 65/48* (2013.01); *B29C 65/787* (2013.01); *B29C 65/7841* (2013.01); *B29C 66/7465* (2013.01); *B29C 66/863* (2013.01); *E06B 3/66342* (2013.01);
(Continued)

(58) Field of Classification Search
CPC ............ E06B 3/67365; E06B 3/67326; E06B 3/67369; E06B 3/66342; E06B 3/67386; B25J 9/0093; B25J 9/1682; B25J 9/1687; B25J 15/0028; B25J 15/0061; B25J 15/10; B25J 15/103; B29C 65/48; B29C 65/7841; B29C 65/787; B29C 66/7465; B29C 66/863; B29K 2709/08; B29L 2031/7782; G05B 2219/39102; G05B 19/4182; Y10T 156/1744; Y10T 156/1746
USPC .................................. 156/109; 29/822, 823
See application file for complete search history.

(56) References Cited

U.S. PATENT DOCUMENTS

| 4,495,023 A | 1/1985 | Lisec |
| 4,803,764 A * | 2/1989 | Lenhardt ............. E06B 3/67313 |
| | | 72/306 |

(Continued)

FOREIGN PATENT DOCUMENTS

| AT | 384607 B | 12/1987 |
| DE | 2712651 B1 | 3/1978 |

(Continued)

OTHER PUBLICATIONS

Machine translation of WO 2021013875 date unknown.*
(Continued)

*Primary Examiner* — John L Goff, II
(74) *Attorney, Agent, or Firm* — Fredrikson & Byron, P.A.

(57) ABSTRACT

The invention provides automated spacer processing systems and methods. The systems and methods involve at least one robot arm that is configured to process spacers for multiple-pane insulating glazing units. In some embodiments, the systems also include an insulating glazing unit assembly line and a spacer conveyor system. Additionally or alternatively, the systems may include a sealant applicator.

34 Claims, 23 Drawing Sheets

(51) Int. Cl.
  *B25J 15/00* (2006.01)
  *B25J 9/16* (2006.01)
  *B29C 65/48* (2006.01)
  *B29C 65/00* (2006.01)
  *B29C 65/78* (2006.01)
  *E06B 3/663* (2006.01)
  *B29L 31/00* (2006.01)
  *B29K 709/08* (2006.01)

(52) U.S. Cl.
  CPC ... *B29K 2709/08* (2013.01); *B29L 2031/7782* (2013.01)

(56) References Cited

U.S. PATENT DOCUMENTS

| | | | |
|---|---|---|---|
| 4,803,775 A * | 2/1989 | Lisec | E06B 3/67365 29/283 |
| 5,167,756 A | 12/1992 | Lenhardt | |
| 5,632,590 A | 5/1997 | Pearson et al. | |
| 6,210,507 B1 | 4/2001 | Hansen et al. | |
| 6,659,634 B2 | 12/2003 | Hiraoka et al. | |
| 8,114,232 B2 | 2/2012 | Lisec | |
| 8,788,086 B2 | 7/2014 | Franz | |
| 8,866,590 B2 | 10/2014 | Wolf et al. | |
| 8,944,308 B2 | 2/2015 | Friedl et al. | |
| 8,967,219 B2 | 3/2015 | Nieminen et al. | |
| 9,689,196 B2 | 6/2017 | Pemberton et al. | |
| 9,718,629 B2 | 8/2017 | Wenninger et al. | |
| 9,925,634 B2 | 3/2018 | Queck et al. | |
| 9,951,553 B2 | 4/2018 | Donohue | |
| 10,183,363 B2 | 1/2019 | Queck et al. | |
| 10,633,200 B2 | 4/2020 | Mader | |
| 2007/0289383 A1 | 12/2007 | Cottone et al. | |
| 2009/0114053 A1 * | 5/2009 | Mikaelsson | B25J 9/0009 901/42 |
| 2012/0207575 A1 | 8/2012 | Masoero et al. | |
| 2015/0025919 A1 | 1/2015 | West | |
| 2015/0259159 A1 | 9/2015 | Herfert | |
| 2015/0274440 A1 | 10/2015 | Strass | |
| 2016/0288185 A1 | 10/2016 | Lattuada | |
| 2016/0303701 A1 * | 10/2016 | Queck | B24B 49/12 |
| 2016/0361821 A1 * | 12/2016 | Lessing | B25J 15/0061 |
| 2019/0003246 A1 | 1/2019 | Trpkovski | |
| 2019/0071921 A1 | 3/2019 | Donohue | |
| 2019/0024441 A1 | 4/2019 | Gobain | |

FOREIGN PATENT DOCUMENTS

| | | |
|---|---|---|
| DE | 3222903 C2 | 3/1984 |
| DE | 202020001040 U1 | 6/2021 |
| EP | 1733909 A2 | 12/2006 |
| FR | 2936835 A1 | 4/2010 |
| JP | 2001139138 A | 5/2001 |
| JP | 2001180822 A | 7/2001 |
| KR | 101778537 B1 | 9/2017 |
| WO | 2011156722 A1 | 12/2011 |
| WO | 2020015864 A1 | 1/2020 |
| WO | 2021013875 A1 | 1/2021 |
| WO | 2021059123 A1 | 4/2021 |

OTHER PUBLICATIONS

AT A 50663/2019 filing date Jul. 23, 2019.*
Website https://www.youtube.com/watch?v=yodslpzO1il, "Lisec VSA, Fully Automatic System for Applying Flexible Spacers to Glass Sheets," Apr. 16, 2014, 3 pages.
Website https://www.youtube.com/watch?v=b5oUrFJTCDU, "LiSEC LBH B25 ARS," Mar. 27, 2018, 3 pages.

* cited by examiner

FIG. 21
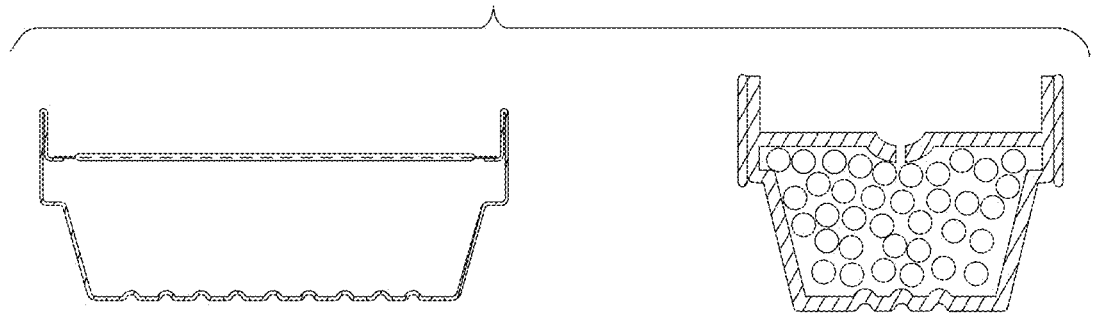
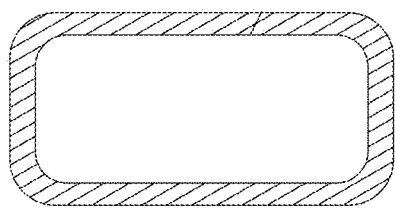
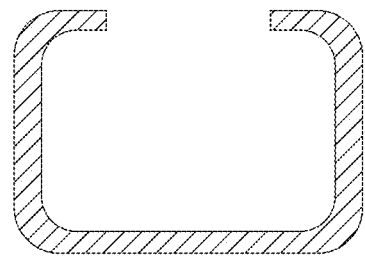
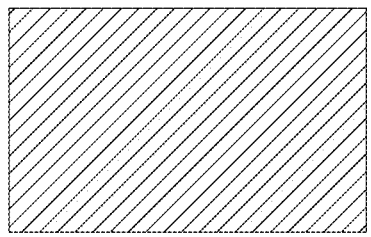
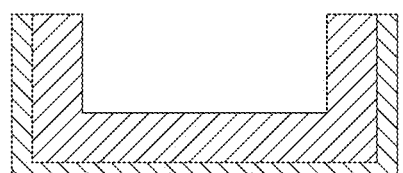
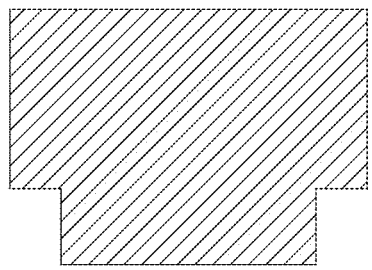

AUTOMATED SPACER PROCESSING SYSTEMS AND METHODS

TECHNICAL FIELD

The present disclosure relates generally to equipment and methods for processing spacers for insulating glass units. More particularly, this disclosure relates to automated equipment and methods for processing such spacers.

BACKGROUND

In the manufacturing facilities that produce insulating glass units, spacers are sometimes transported by a conveyor. In some cases, it is desirable at a given location to remove the spacers from the conveyor and attach each spacer onto a glass sheet. This has been done manually, e.g., by workers physically grabbing a spacer off an overhead conveyor and thereafter attaching it onto a glass sheet located on a nearby IG unit assembly line. In addition, certain automated spacer processing techniques have been disclosed.

It would be desirable to provide automated equipment and methods for processing spacers for IG units. In some cases, this may involve a robot removing the spacers from a conveyor and attaching them to respective glass sheets. It would be particularly desirable to provide equipment and methods of this nature that offer the ability to handle spacers securely, reliably, and on an adjustable basis, e.g., such that the equipment is adjustable to process spacers of different sizes, different shapes, or both. It would be particularly desirable, for example, to provide such equipment with an adjustable gripper configured to grip spacers of different sizes and shapes. In addition, it would be desirable to provide automated equipment and methods for applying sealant to spacers.

SUMMARY

In certain embodiments, the invention provides a robotic spacer processing system that includes an insulating glazing unit assembly line, a spacer conveyor system, and a first robot arm. The spacer conveyor system includes a spacer conveyor line along which spacers can be conveyed. The first robot arm is equipped with a first gripper frame. The robotic spacer processing system has first and second positions. The robotic spacer processing system when in the first position has the first gripper frame holding a spacer adjacent the spacer conveyor line. The robotic spacer processing system when in the second position has the first gripper frame holding the spacer adjacent the insulating glazing unit assembly line.

Some embodiments of the invention provide a robotic spacer processing system that includes an insulating glazing unit assembly line, a spacer conveyor system, a sealant applicator, and a first robot arm. The spacer conveyor system includes a spacer conveyor line along which spacers can be conveyed. The first robot arm is equipped with a first gripper frame. The robotic spacer processing system has a first position, an intermediate position, and a second position. The robotic spacer processing system when in the first position has the first gripper frame holding a spacer adjacent the spacer conveyor line. The robotic spacer processing system when in the intermediate position has the first gripper frame holding the spacer adjacent the sealant applicator. The robotic spacer processing system when in the second position has the first gripper frame holding the spacer adjacent the insulating glazing unit assembly line.

Certain embodiments of the invention provide a robotic spacer processing system comprising a first robot arm. In the present embodiments, the first robot arm is a multi-axis robot arm with six axes of rotation. The first robot arm is equipped with a first gripper frame. Preferably, the first gripper frame has a plurality of grippers configured to grip a spacer.

The details of one or more examples are set forth in the accompanying drawings and the description below. Other features, objects, and advantages will be apparent to skilled artisans given the present descriptions, drawings, and claims.

BRIEF DESCRIPTION OF DRAWINGS

FIG. 21 is a cross-sectional view of various spacer configurations that can be used with the present equipment and methods.

DETAILED DESCRIPTION

Figure 1:
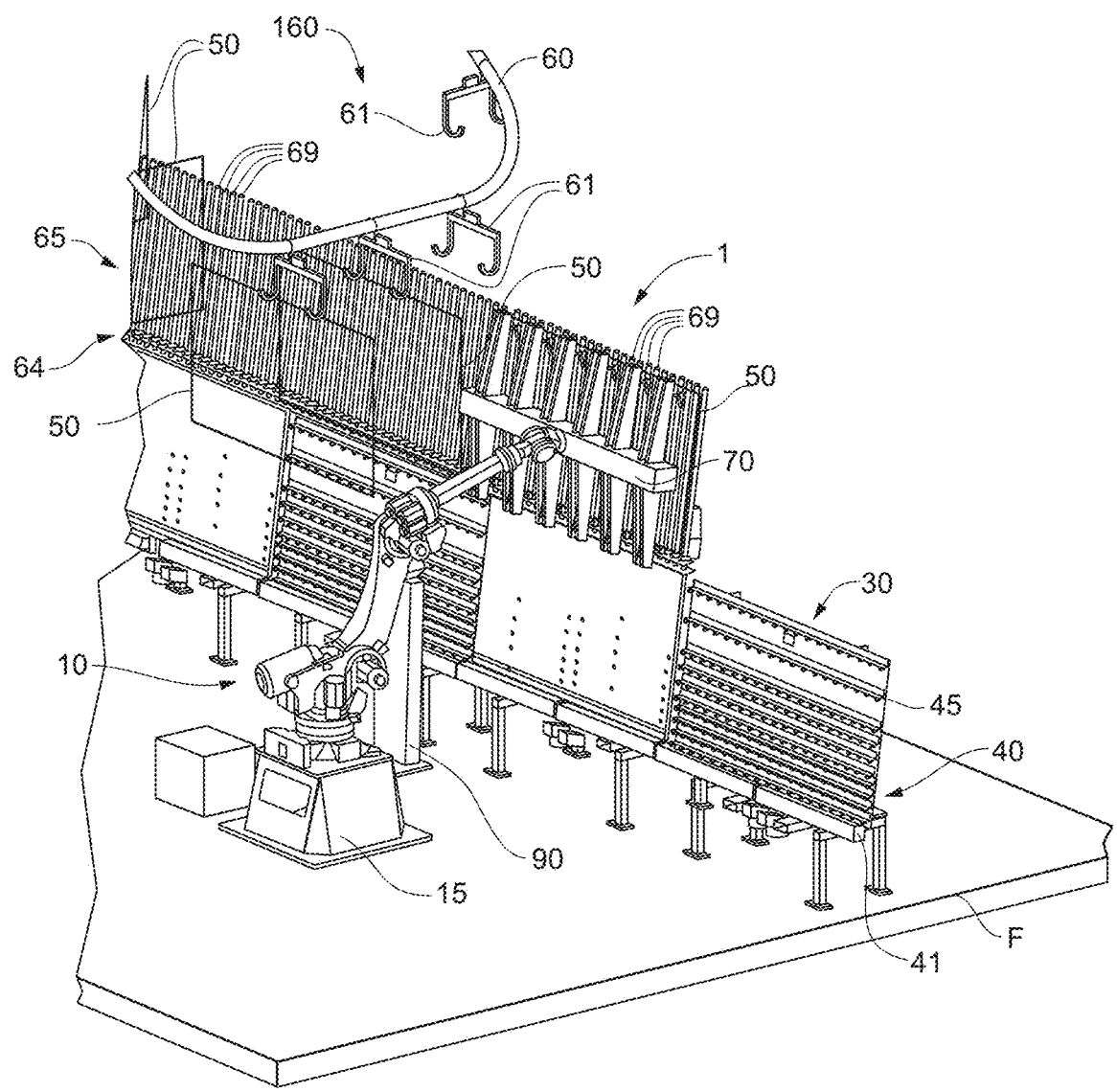
FIG. 1 is a perspective view of a robotic spacer processing system in accordance with certain embodiments of the present invention, with a first robot arm of the system shown in a start position.

The invention provides a robotic spacer processing system, which is identified by reference number 1. The robotic spacer system 1 is configured to process spacers 50 for multiple-pane insulating glazing units 100 ("IG units"). The IG units can be double-pane IG units or triple-pane IG units.

Many different types of spacers can be used in multiple-pane insulating glazing units. The present systems can process a variety of different spacer types. FIG. 21 shows several non-limiting examples of spacer types that can be used. In some cases, the spacers processed by the present systems, and used in the present methods, comprise or consist of a metal, such as stainless steel or another alloy, aluminum, titanium or another aircraft metal, or some other suitable metal. Reference is made to the first four spacer profiles shown in FIG. 21. Alternatively, the spacer can consist of a polymer. Reference is made to the fifth and seventh spacer profiles shown in FIG. 21. In other cases, the spacer can comprise both a metal and a polymer. For example, a plastic spacer body can be provided with a metal moisture barrier layer. Reference is made to the sixth spacer profile shown in FIG. 21. Another possibility is to use a spacer with two opposed side walls of plastic and two opposed top walls of metal.

The robotic spacer processing system 1 comprises a first robot arm 10. The first robot arm 10 has multiple axes of rotation (i.e., it is a multi-axis robot arm), preferably including a vertical axis of rotation, and perhaps optimally also including a horizontal axis of rotation. The first robot arm 10 desirably has four or more (e.g., six) axes of rotation. Suitable robot arms are commercially available from Fanuc of Yamanashi, Japan, for example, under model number R2000iC/165.

Preferably, the first robot arm 10 has a mount base 15 that is mounted to a floor F. This is shown, for example, in FIGS. 1-16. Here, it can be appreciated that the illustrated first robot arm 10 has multiple axes of rotation, including a vertical axis of rotation. Thus, the first robot arm preferably is an articulated robot having multiple rotary joints that provide multiple axes of rotation. The rotary joints, and the resulting axes of rotation, preferably are at locations spaced apart in series along the first robot arm. In more detail, starting from a base of the first robot arm and moving toward a working end thereof, each rotary joint located closer to the base preferably supports one or more rotary joints located closer to the first robot arm's working end (which carries the first gripper frame). Thus, starting from the base, each rotary joint preferably supports (e.g., provides an additional degree of motion freedom to) the rotary joints further along the robot arm. The robot arm preferably comprises multiple servo motors, e.g., one for each rotary joint. In the embodiments illustrated, the first robot arm 10 has a first (counting in sequence from the base toward the working end) rotary axis that is vertical and a subsequent (e.g., second) rotary axis that is horizontal. This can optionally be the case for any embodiment of the present disclosure. While the first robot arm is shown mounted to the floor, it can alternatively be suspended from an overhead frame or the like.

The first robot arm 10 is equipped with a first gripper frame 70, which is configured to grip a spacer 50. Reference is made to FIGS. 1-16 and 18A-20C. In more detail, the first gripper frame 70 has a plurality of grippers 75 that are each configured to grip a spacer 50. Preferably, at least some of the grippers 75 are adjustable grippers, such that the first gripper frame 70 is configured to hold spacers 50 of different sizes, different shapes, or both. Additionally or alternatively, the first gripper frame 70 can optionally be configured to grip (e.g., simultaneously) all four legs of a rectangular spacer. FIGS. 1-16 and 18A-20C show non-limiting examples of spacers 50 that each have a rectangular configuration (i.e., where four legs of the spacer collectively delineate a rectangular shape).

Figure 18A:
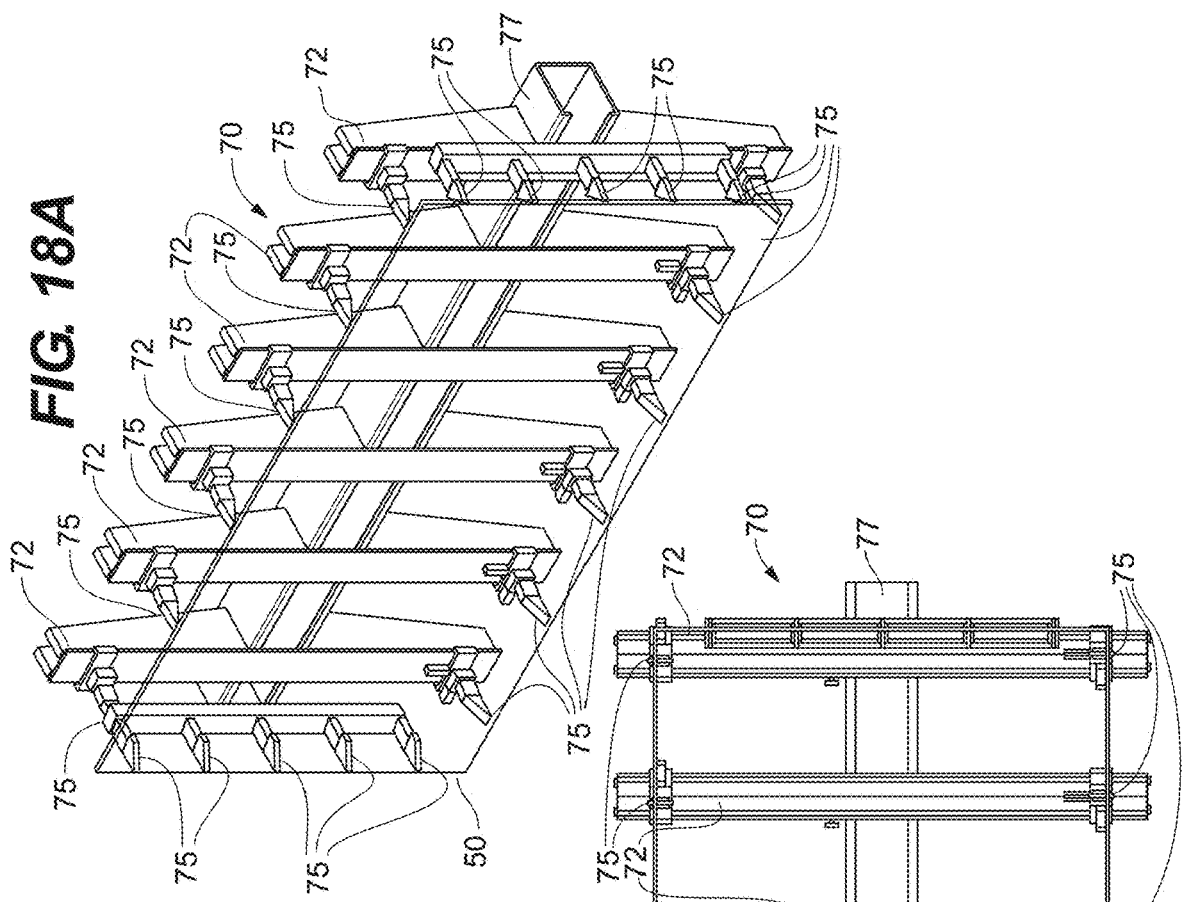
FIG. 18A is a perspective view of a gripper frame in accordance with certain embodiments of the present invention, shown holding a first spacer.
Figure 18B:
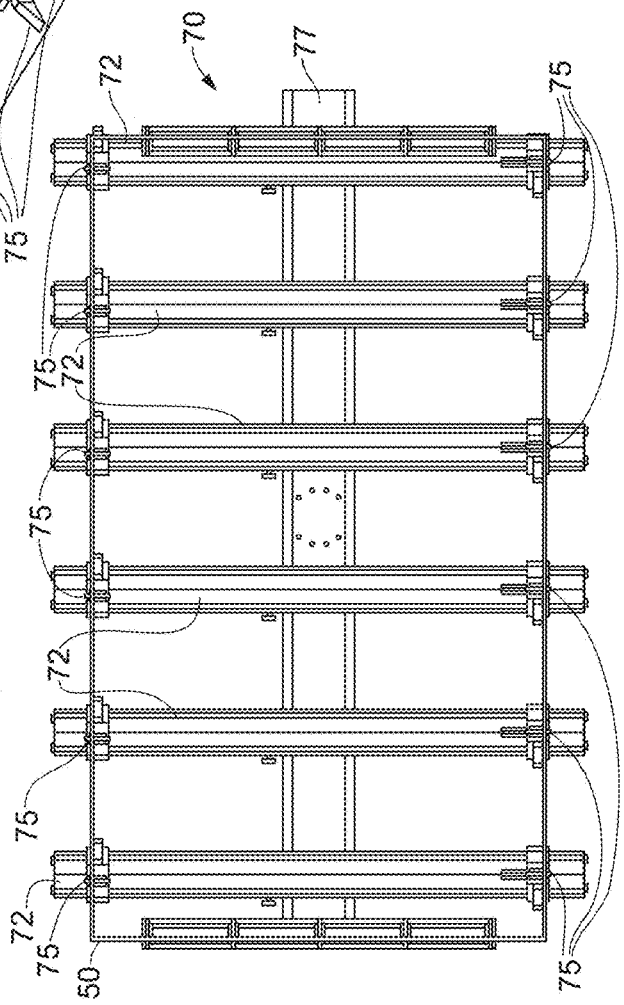
FIG. 18B is a front view of the gripper frame of FIG. 18A.
Figure 18C:
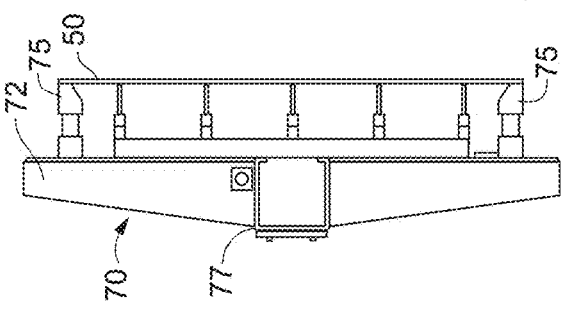
FIG. 18C is a side view of the gripper frame of FIG. 18A.
Figure 19A:
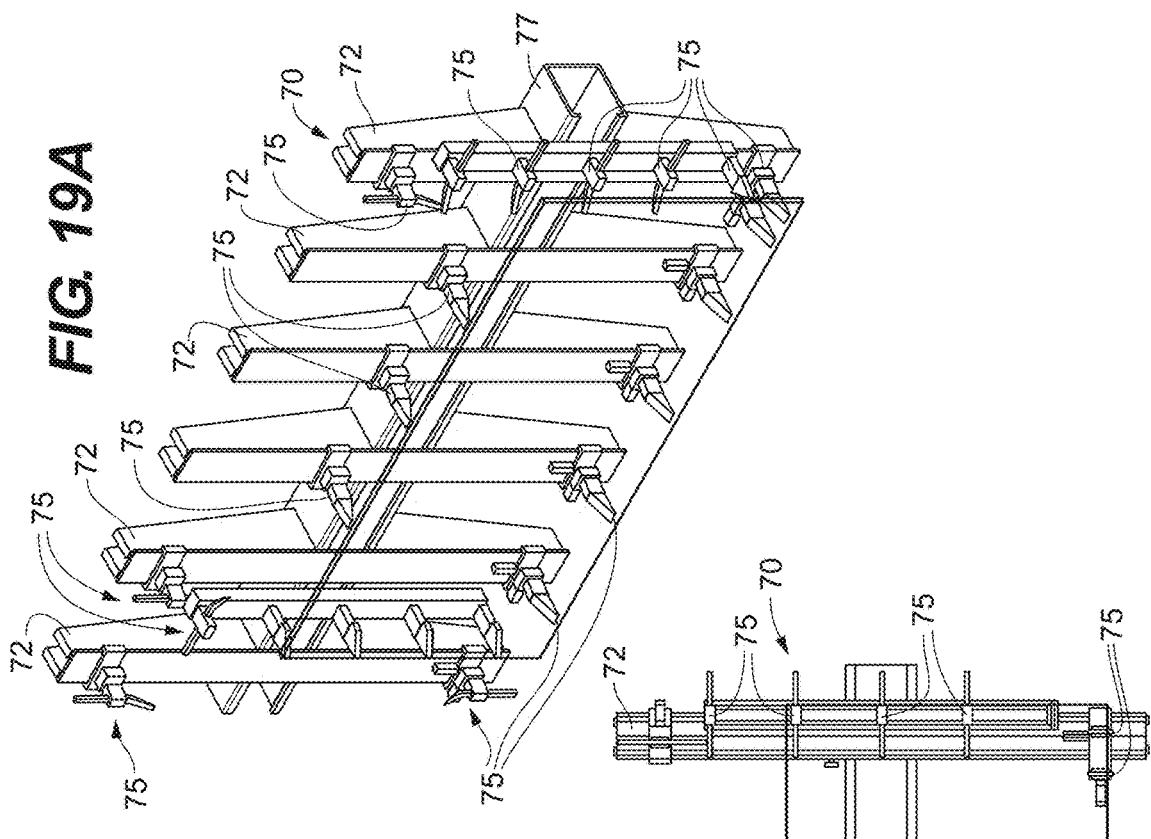
FIG. 19A is a perspective view of the gripper frame of FIG. 18A, shown holding a second spacer, which is smaller than the first spacer.
Figure 19B:
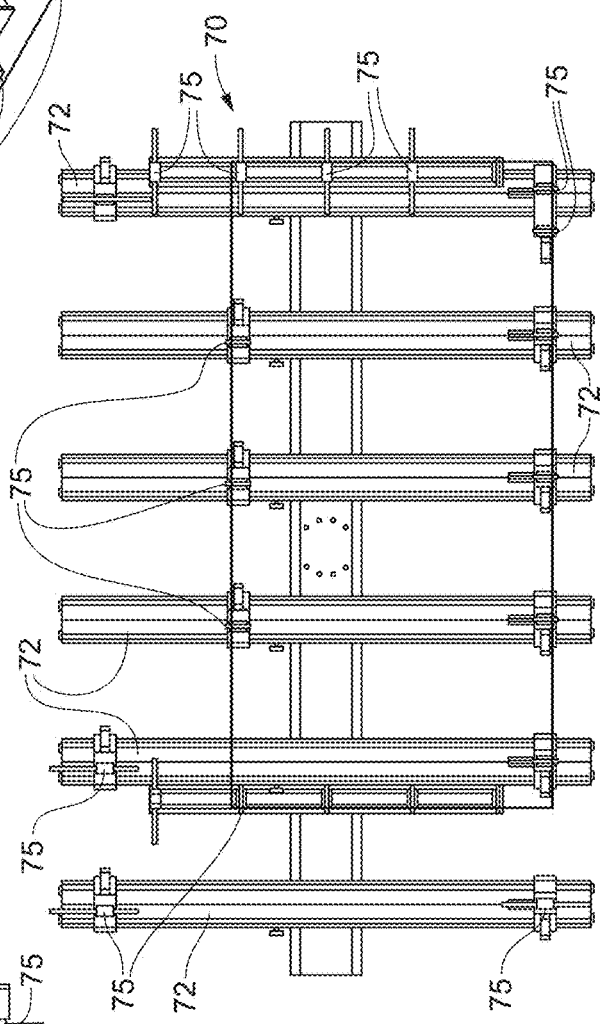
FIG. 19B is a front view of the gripper frame of FIG. 19A.
Figure 19C:
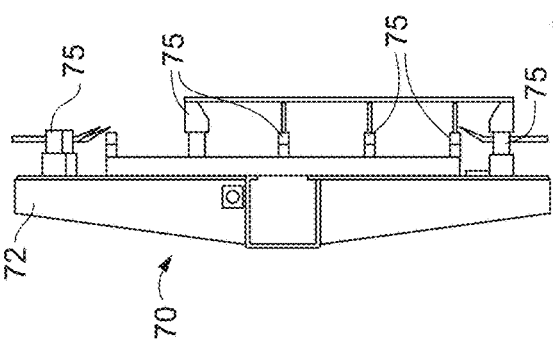
FIG. 19C is a side view of the gripper frame of FIG. 19A.
Figure 20A:
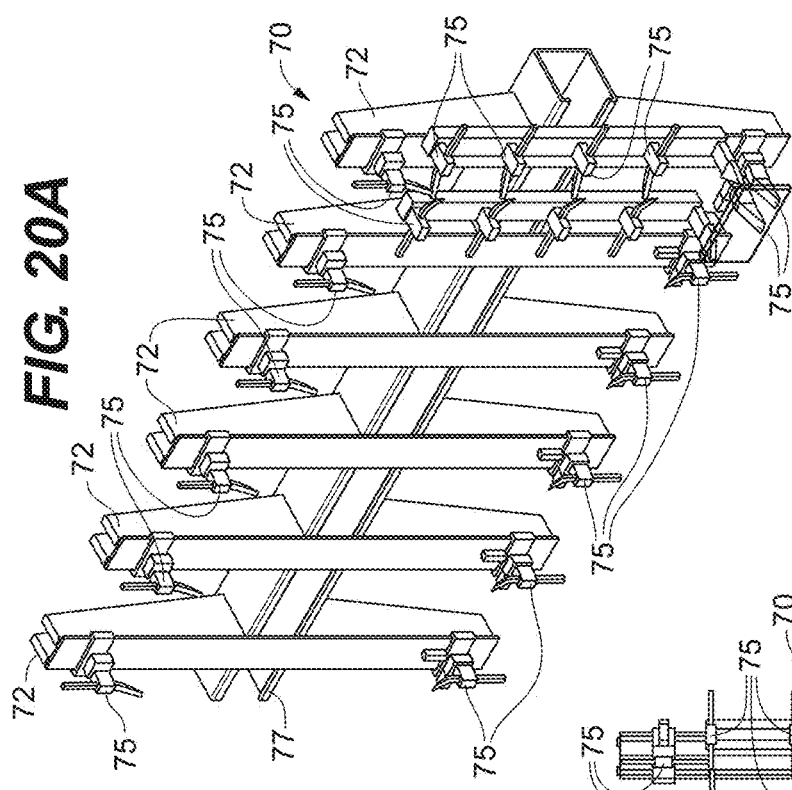
FIG. 20A is a perspective view of the gripper frame of FIG. 18A, shown holding a third spacer, which is smaller than the second spacer.
Figure 20B:
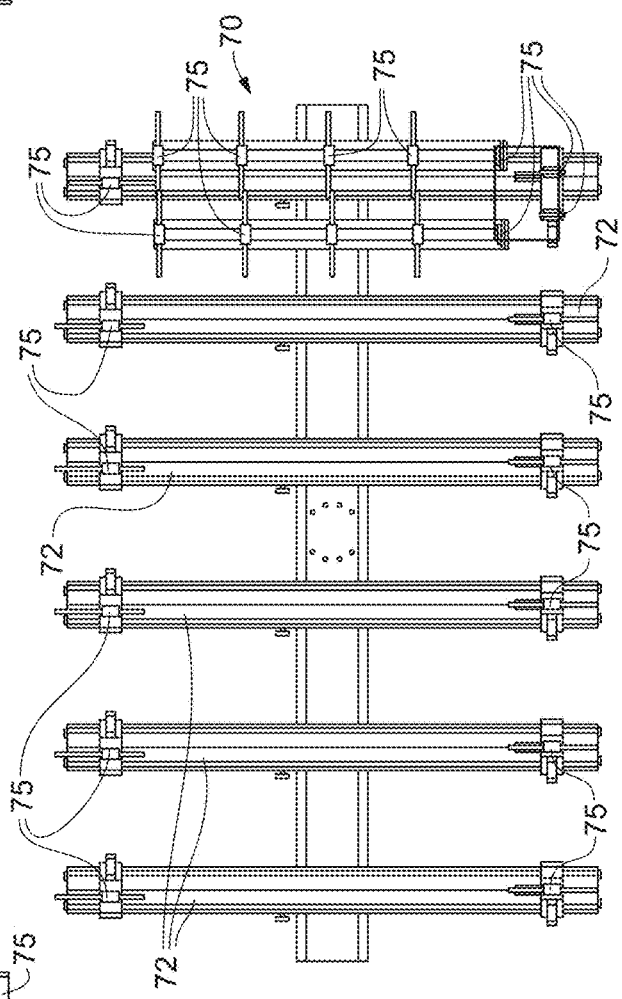
FIG. 20B is a front view of the gripper frame of FIG. 20A.
Figure 20C:
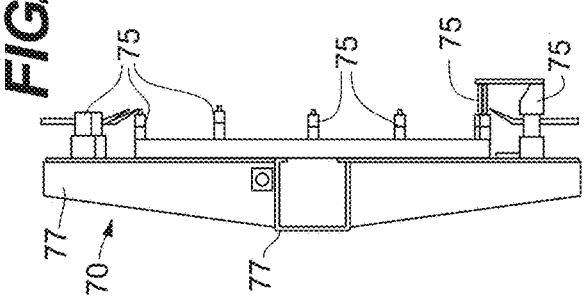
FIG. 20C is a side view of the gripper frame of FIG. 20A.

FIGS. 18-20 (i.e., FIGS. 18A, 18B, 18C, 19A, 19B, 19C, 20A, 20B, and 20C) show one non-limiting example of a suitable configuration for the first gripper frame 70. Here, the first gripper frame 70 comprises a plurality of frame members 72. The illustrated frame members 72 are spaced apart from one another and substantially parallel to one another. The first gripper frame 70 preferably includes at least one crossbeam 77 that is crosswise (e.g., perpendicular) to a plurality of (e.g., all) the frame members 72. In the illustrated example, the working end of the first robot arm 10 is attached to the crossbeam 77 of the first gripper frame 70. This, however, is not required.

As can be appreciated by referring to FIGS. 18-20, each gripper 75 can optionally have an open position and a closed position. In such cases, each gripper 75 can be selectively opened or closed. To grip an adjacent spacer 50, a plurality of such grippers 75 can be actuated so as to move from the open position to the closed position, thereby clamping onto opposed sides of the spacer.

As illustrated, the first gripper frame 70 preferably comprises a plurality of tracks along which respective adjustable grippers 75 are movable (e.g., slidable or otherwise adjustable) to different positions. This enables handling spacers of different sizes and shapes. Preferably, at least some adjustable grippers 75 are movable along tracks extending along a height of the gripper frame, as shown in FIGS. 18-20. In addition, the gripper frame can optionally include at least one line of grippers that is moveable (e.g., slidable or otherwise adjustable) along a width of the gripper frame. As can be appreciated from FIGS. 18-20, one line of grippers 75 can optionally be adjustable along a width of the gripper. This line of grippers can be adjustable (e.g., slidably actuatable by a servo motor) along a track that is perpendicular to tracks on the frame members 72. Another option is to have this line of grippers be manually removable and replaceable at different points along the width of the gripper frame. Thus, some of the grippers 75 on the gripper frame 70 can be adjustable while others are mounted in fixed positions on the gripper frame. Given the present teaching as a guide, skilled artisans will appreciate that a variety of different gripper frame configurations can be used.

It is to be appreciated that the first robot arm 10 can be incorporated in various different embodiments of the robotic spacer processing system 1. In certain embodiments, the robotic spacer processing system 1 further includes an insulating glazing unit assembly line (or "IG line") 30 and a spacer conveyor system 160. When provided, the insulating glazing unit assembly line 30 includes a pane conveyor line 40, while the spacer conveyor system 160 includes a spacer conveyor line 65. In such embodiments, the IG line 30 and the spacer conveyor line 65 are both adjacent the first robot arm 10.

Figure 2:
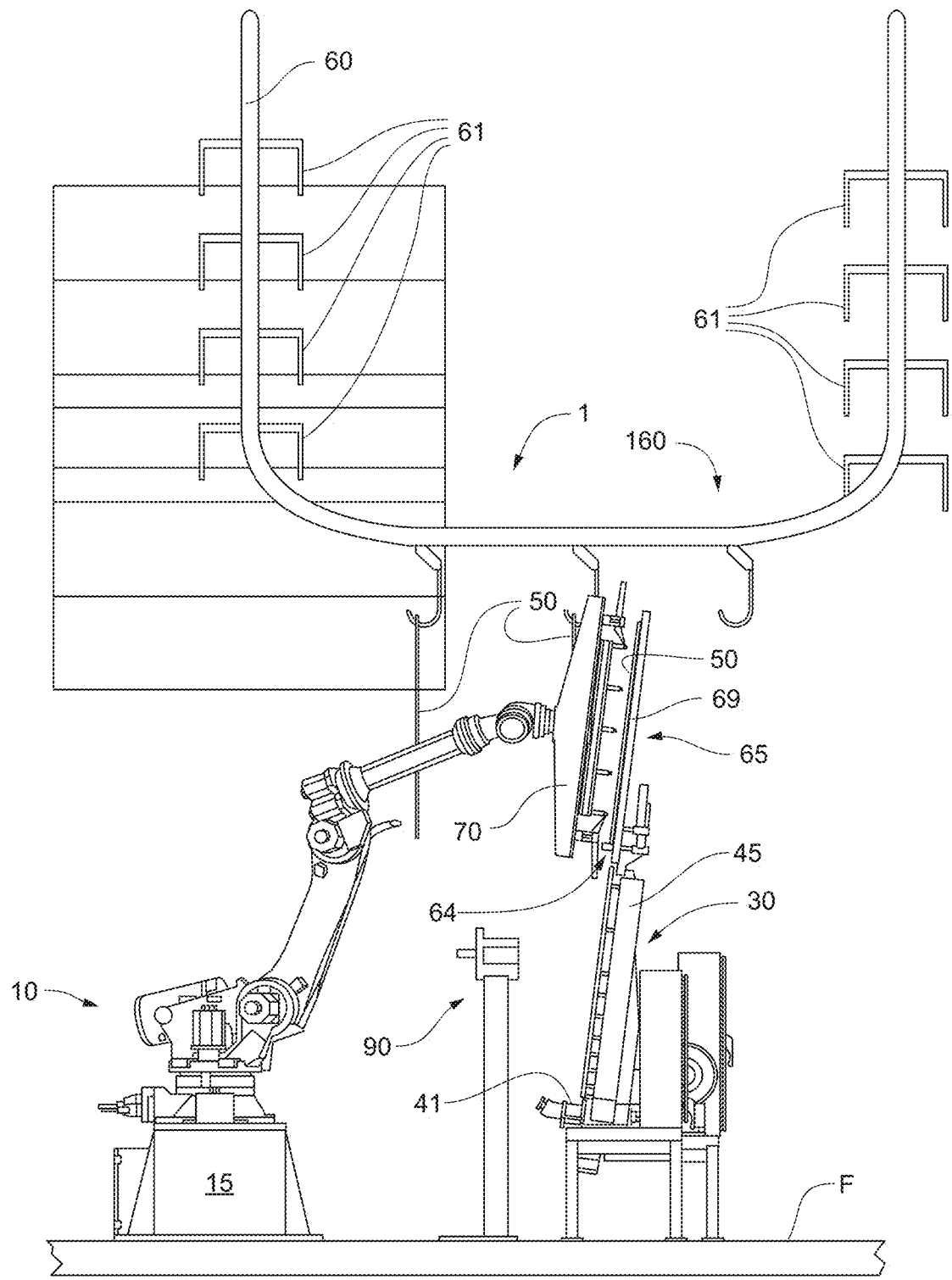
FIG. 2 is an end view of the spacer processing system of FIG. 1.

In FIGS. 1-16, the spacer conveyor line 65 is located above (e.g., at a higher elevation than, and optionally directly above) the insulating glazing unit assembly line 30. Here, the illustrated spacer conveyor line 65 has a staging area, where a spacer 50 is to be positioned for the first gripper frame 70 to pick it off the spacer conveyor line. FIGS. 1 and 2 show a spacer 50 positioned on the staging area, and thus ready to be picked up by the first gripper frame 70. The staging area of the spacer conveyor line 65 can optionally be above (e.g., directly above) a processing area of the IG line 30. In such cases, the processing area of the IG line 30 is a location where the spacer 50 is subsequently pressed against, and thereby adhered to, a pane 200 that is on the IG line 30.

While the illustrated spacer conveyor line 65 is above the IG line 30, this is not required. For example, the spacer conveyor line can alternatively be a stand-alone conveyor located behind, or extending alongside, the first robot arm. As another possibility, the spacer conveyor line 65 itself can alternatively be an overhead conveyor off which the first robot arm directly picks the spacers. Many suitable variants along these lines will be apparent to skilled artisans given the present teaching as a guide.

In certain preferred embodiments, the spacer conveyor system 160 further includes an overhead conveyor 60. With continued reference to FIGS. 1-16, the overhead conveyor 60 is located (e.g., in part, substantially entirely, or entirely) above the spacer conveyor line 65. When provided, the overhead conveyor 60 delineates a spacer path along which spacers 50 are conveyed. Part or all of the spacer path can be curved, if desired, depending on the desired overhead spacer routing.

The illustrated overhead conveyor 60 comprises a plurality of hooks 61 configured to respectively retain a plurality of spacers 50, e.g., such that the spacers hang downwardly from the hooks. In the embodiments illustrated, each of the hooks 61 comprises a pair of hook arms, and each pair of hook arms is configured to retain a spacer 50 in a hanging position therefrom. These details, however, are by no means required.

Preferably, part of the spacer path delineated by the overhead conveyor 60 intersects (e.g., passes through) the spacer conveyor line 65. In such cases, at least a certain length of the spacer path is crosswise to (e.g., so as to pass through, in crosswise manner) the spacer conveyor line 65. This can allow spacers 50 conveyed along the spacer path to automatically drop down onto the spacer conveyor line 65. In more detail, a spacer 50 conveyed by the overhead conveyor 60 will reach a region of intersection with the spacer conveyor line 65, and upon reaching that intersection region, the spacer will contact spaced-apart upright members 69 of the spacer conveyor line. Preferably, the upright members 69 comprise generally vertical rollers, which may be offset from true vertical by a few degrees (e.g., about 3-7 degrees). As the hook 61 of the overhead conveyor 60 moves through and past the spacer conveyor line 65, the spacer 50 will be caught on the noted upright members 69 and thus pulled off the hook 61, thereby causing the spacer to fall onto the spacer conveyor line.

Thus, in certain preferred embodiments, the spacer conveyor line 65 has a transfer region that is configured to receive spacers 50 transferred (e.g., dropped) from the overhead conveyor 60. As noted above, the transfer region of the spacer conveyor line 65 can optionally be located at a region of intersection of the overhead conveyor 60 and the spacer conveyor line 65.

The transfer region of the spacer conveyor line 65 can optionally be upstream of a spacer staging area. In the embodiment of FIGS. 1-16, the transfer region is located upstream of, and next to, the spacer staging area. In embodiments of this nature, once a spacer 50 is transferred from the overhead conveyor 60 onto the transfer region of the spacer conveyor line 65, the spacer is conveyed (e.g., in a horizontal direction) along the spacer conveyor line 65 to the spacer staging area.

The spacer conveyor line 65 preferably includes a bottom conveyor 64 configured to support a bottom side of the spacer 50. The bottom conveyor can comprise, for example, a series of spaced-apart transport rollers, at least some of which are powered. Additionally or alternatively, the bottom conveyor can comprise one or more conveyor belts. Another possibility is to have the bottom conveyor slightly inclined in the direction of the spacer staging area, such that a spacer on the bottom conveyor moves under the force of gravity along the bottom conveyor to the spacer staging area. In such cases, there may be a stop (such as an adjustably-positionable stop) to bring the spacer to rest at a desired position on the spacer staging area.

When provided, the IG line 30 is configured to convey a stream of panes (e.g., glass panes) 200 along the pane conveyor line 40. The IG line 30 preferably is configured to convey panes 200 along the pane conveyor line 40 while retaining them in an upright (e.g., generally vertical) orientation. This can be appreciated, for example, in FIGS. 1-16.

The pane conveyor line 40 preferably includes an upright conveyor wall 45. The illustrated conveyor wall 45 is configured to maintain panes 200 in a vertical-offset orientation while conveying them along the pane conveyor line 40. The vertical-offset orientation is characterized by the panes 200 being offset from true vertical by less than 10 degrees, such as about 3-7 degrees. The upright conveyor wall 45 can comprise a platen or frame. Preferably, it includes a plurality of rollers, rotatable discs or spheres, casters, or the like along which the rear sides of the panes 200 can readily roll or slide when the panes are conveyed along the pane conveyor line 40. Additionally or alternatively, the upright conveyor wall 45 can provide an air cushion.

The illustrated pane conveyor line 40 also includes a bottom conveyor 41, which preferably is configured to support a bottom edge of each pane 200 being conveyed along the pane conveyor line. Thus, a pane 200 conveyed along the pane conveyor line 40 preferably has a bottom edge supported by the bottom conveyor 41 and a rear side (e.g., a rear major surface) supported by the upright conveyor wall 45.

The panes 200 preferably are monolithic sheets of glass (or "lites"). It is to be appreciated, however, that the present systems and methods can alternatively use other types of substrates, such as polymer (e.g., polycarbonate) sheets. In some cases, the pane conveyor line 40 extends toward (e.g., is located upstream of) an automated station configured to deliver thermally insulative gas (e.g., a mix of argon and air) into the between-pane space(s) of the IG units being produced.

Thus, the illustrated pane conveyor line 40 defines a path of pane travel, which preferably extends in a horizontal (or at least substantially horizontal) direction. As noted above, the pane conveyor line 40 (e.g., a bottom conveyor 41 thereof) may include a plurality of transport rollers and/or a plurality of conveyor belts.

Figure 3:
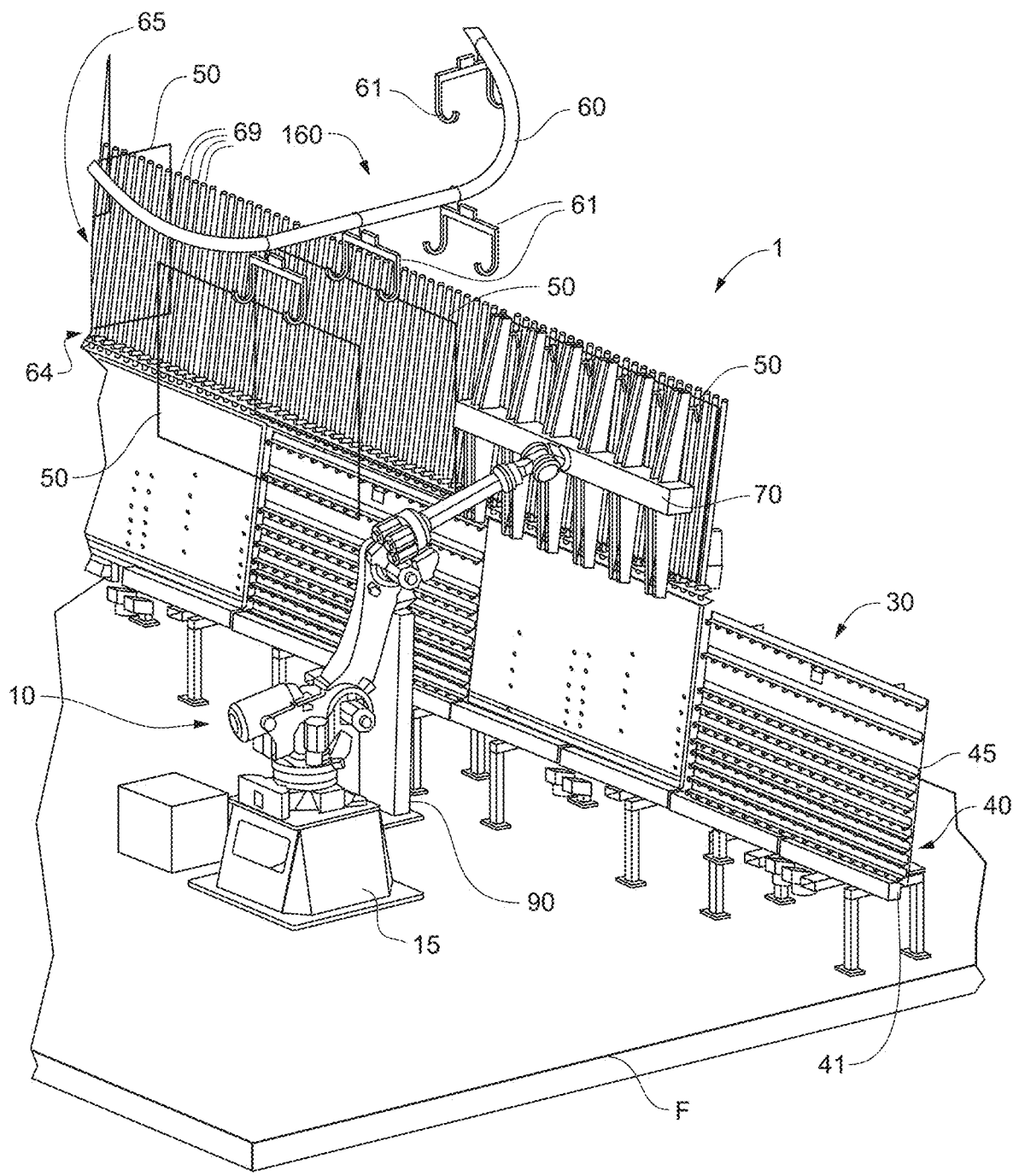
FIG. 3 is another perspective view of the robotic spacer processing system of FIG. 1, with the first robot arm shown in a first position.
Figure 4:
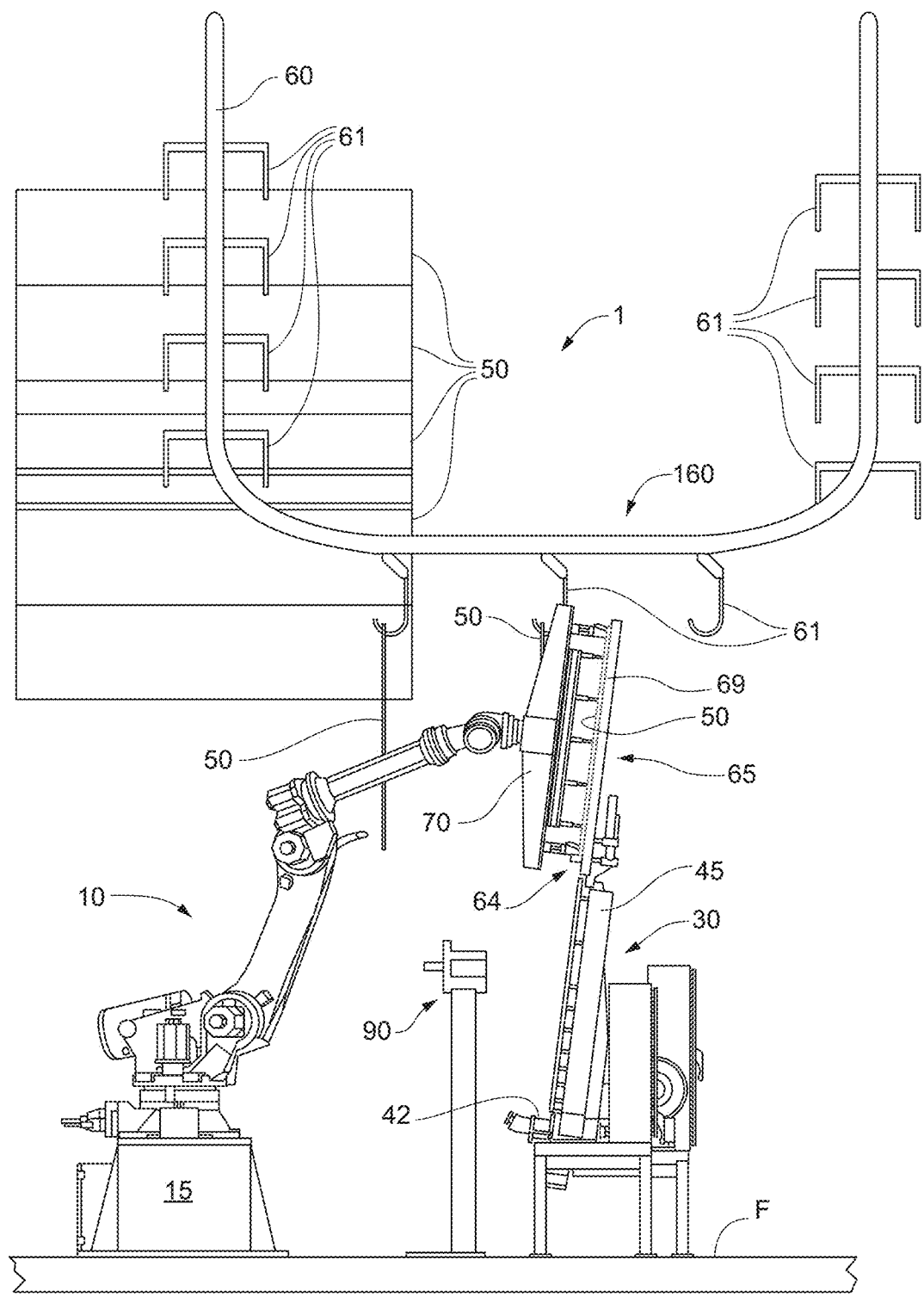
FIG. 4 is an end view of the spacer processing system of FIG. 3.
Figure 5:
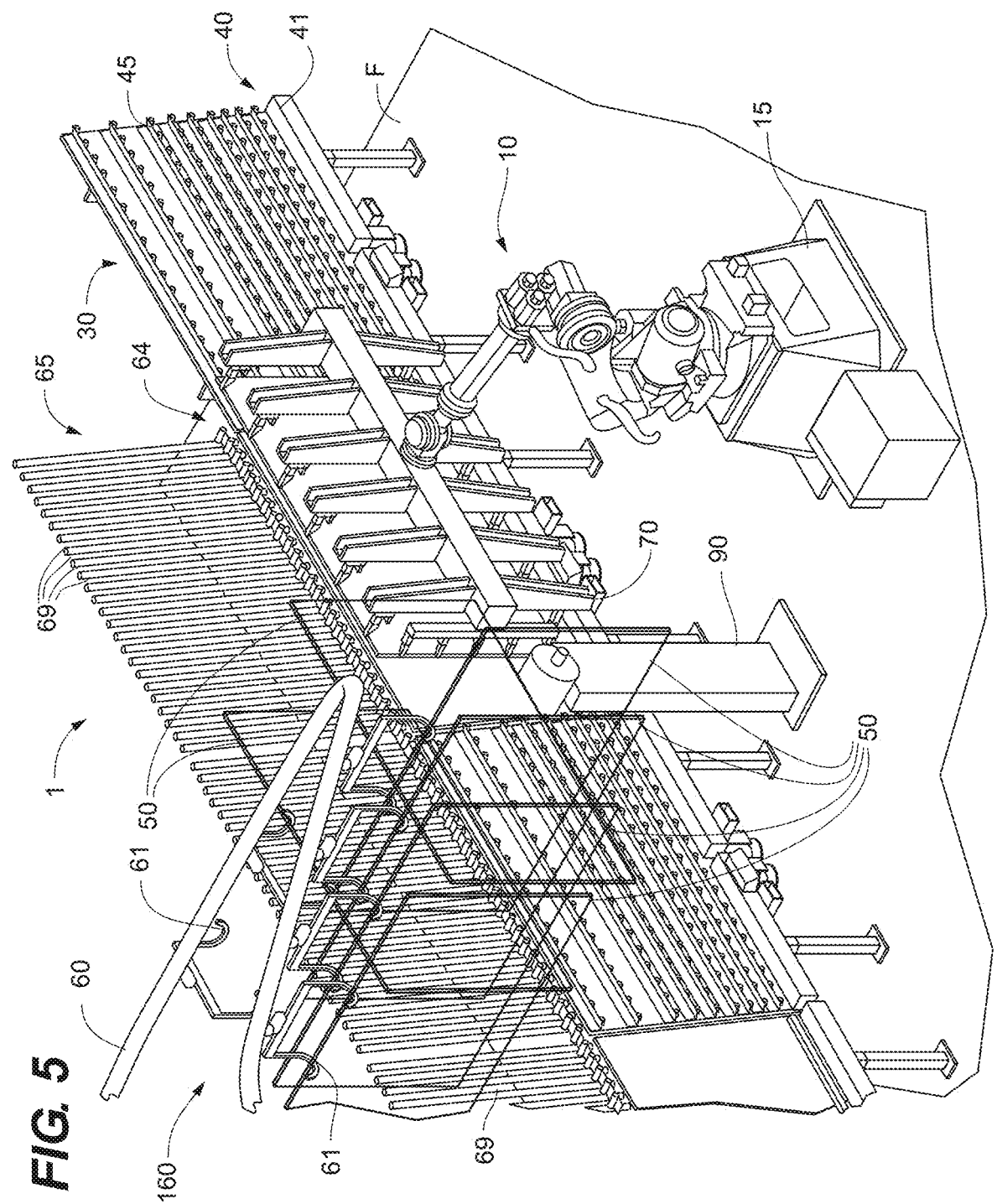
FIG. 5 is still another perspective view of the robotic spacer processing system of FIG. 1, with the first robot arm shown in a sealing position.
Figure 6:
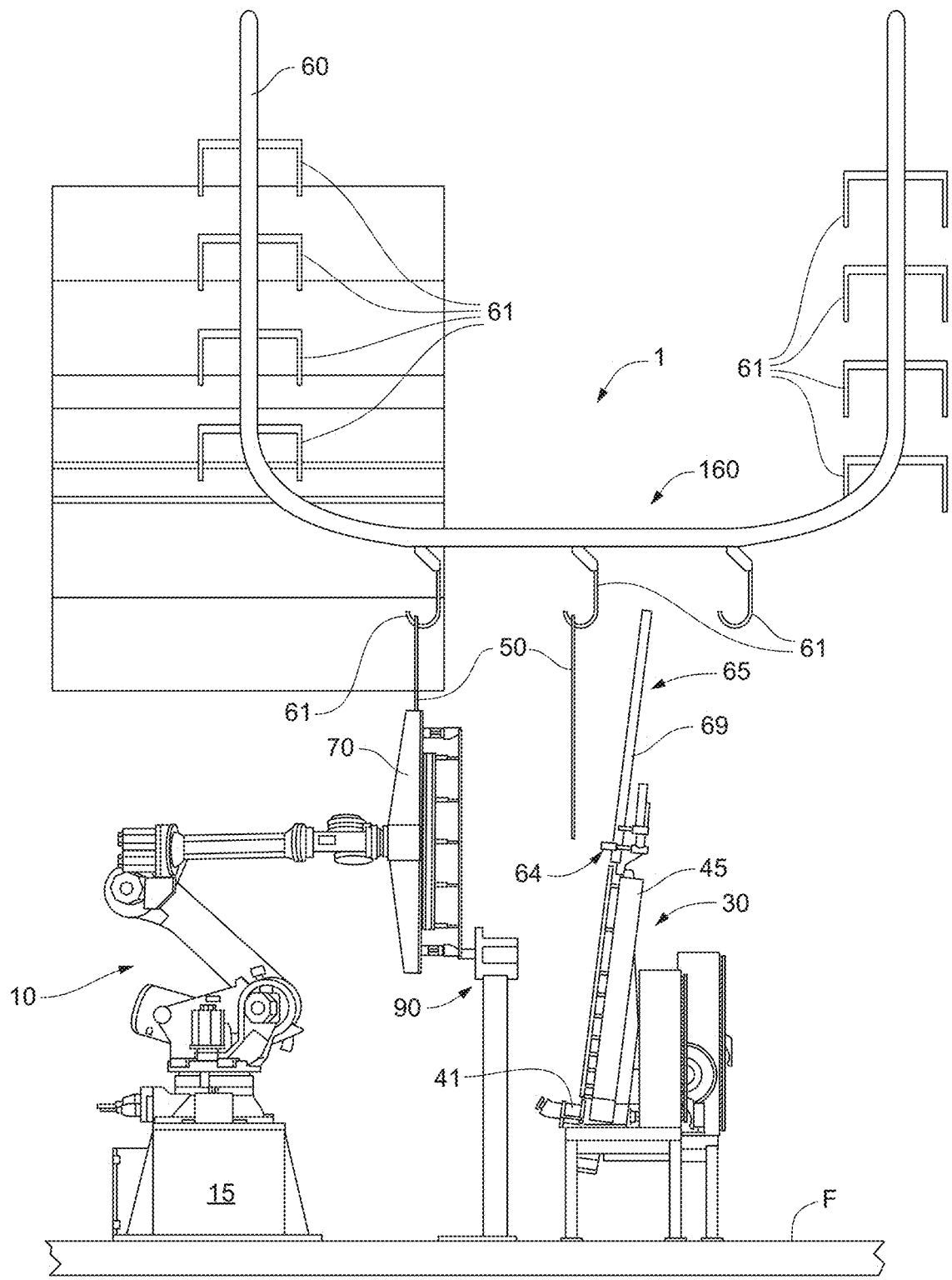
FIG. 6 is an end view of the spacer processing system of FIG. 5.
Figure 7:
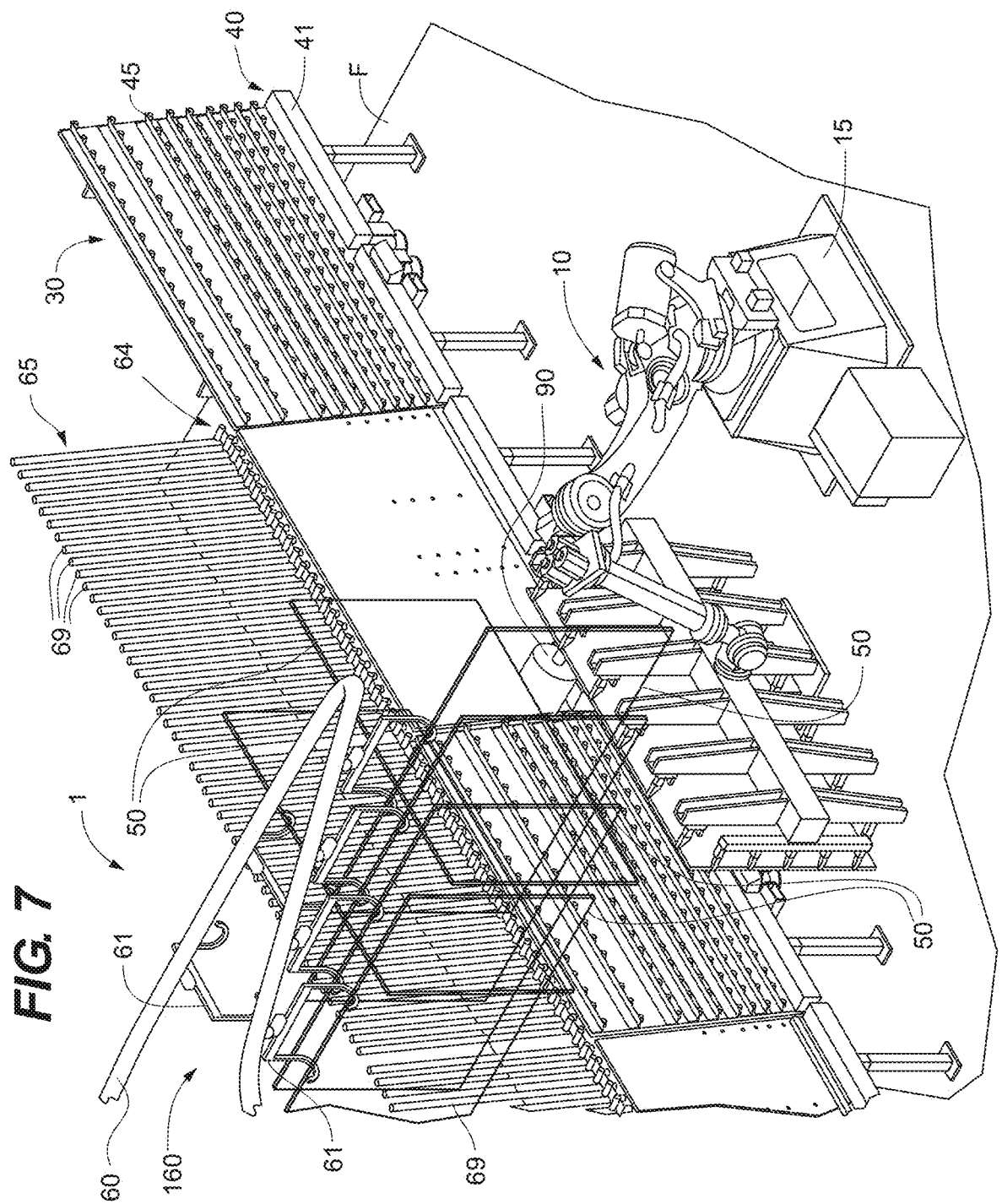
FIG. 7 is yet another perspective view of the robotic spacer processing system of FIG. 1, with the first robot arm shown in another sealing position.
Figure 8:
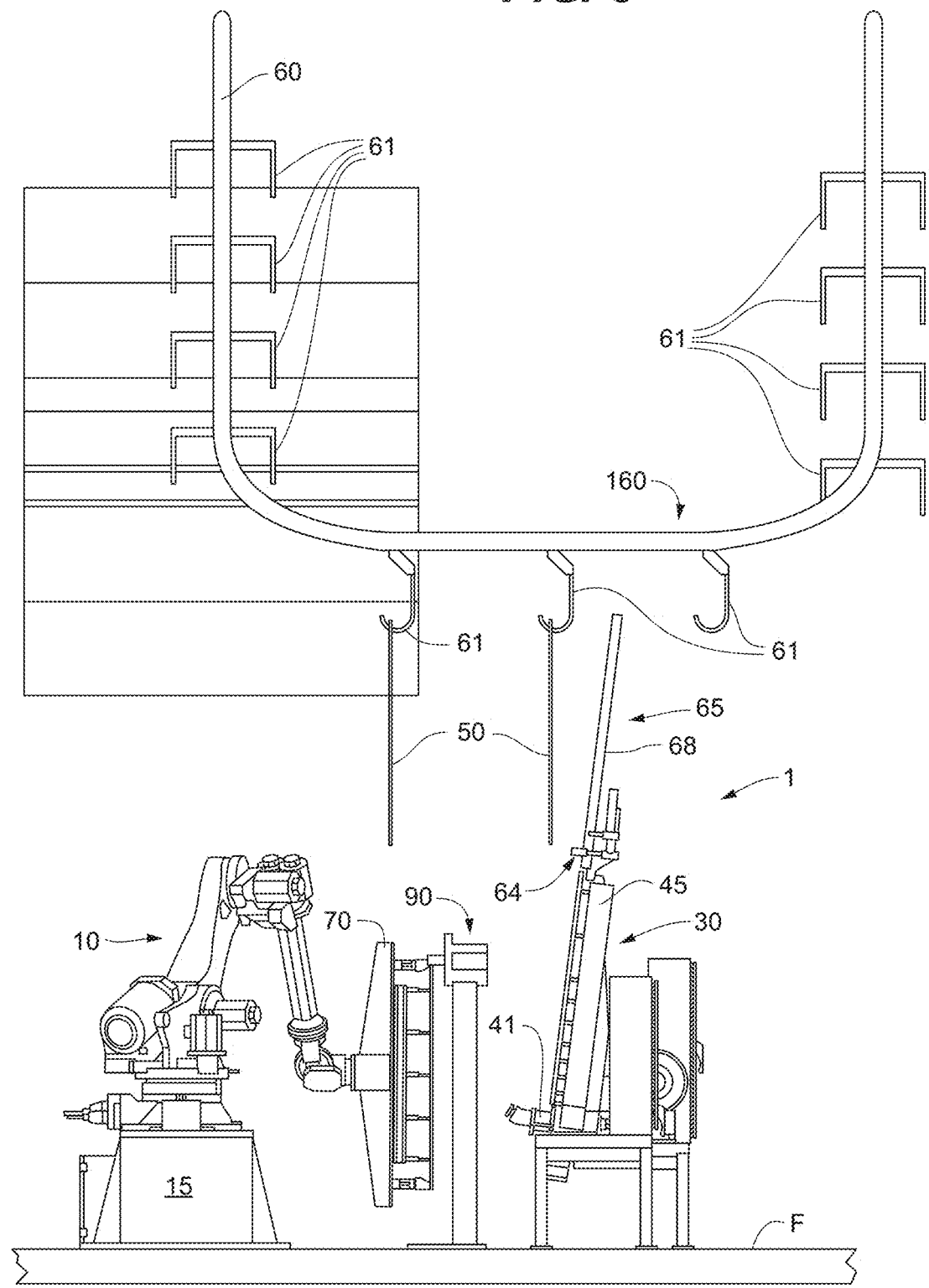
FIG. 8 is an end view of the spacer processing system of FIG. 7.
Figure 9:
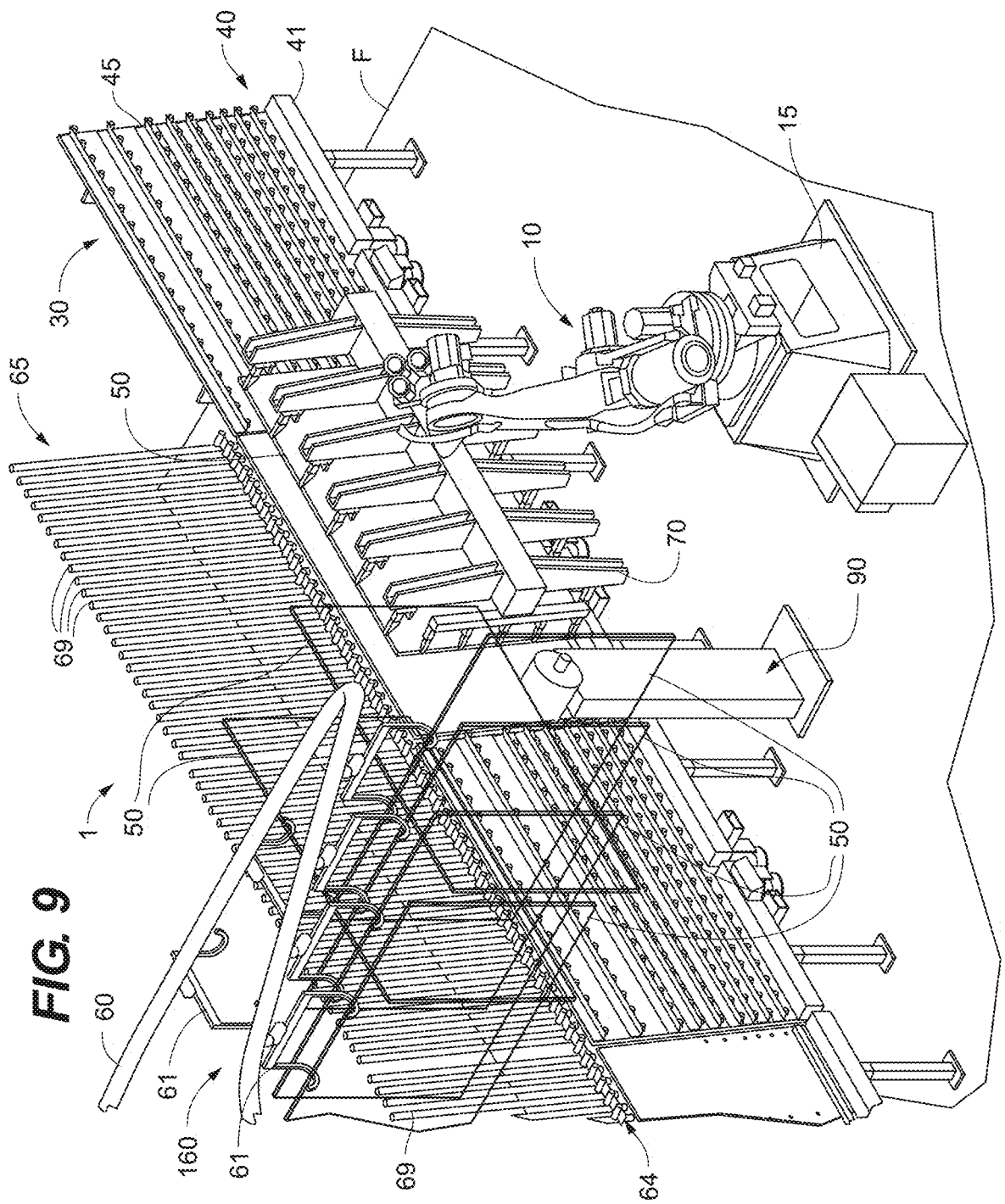
FIG. 9 is still another perspective view of the robotic spacer processing system of FIG. 1, with the first robot arm shown in a second position.
Figure 10:
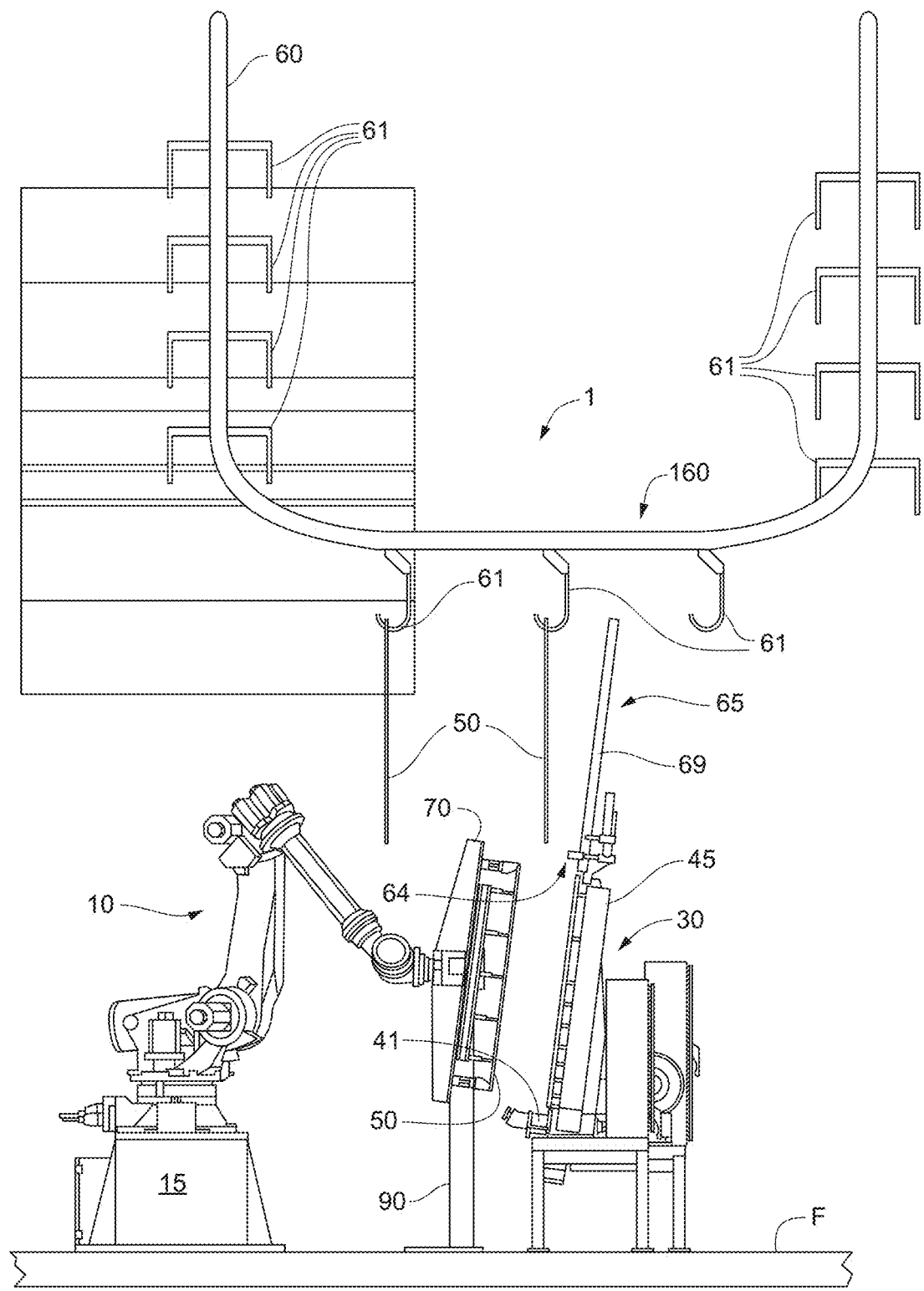
FIG. 10 is an end view of the spacer processing system of FIG. 9.
Figure 11:
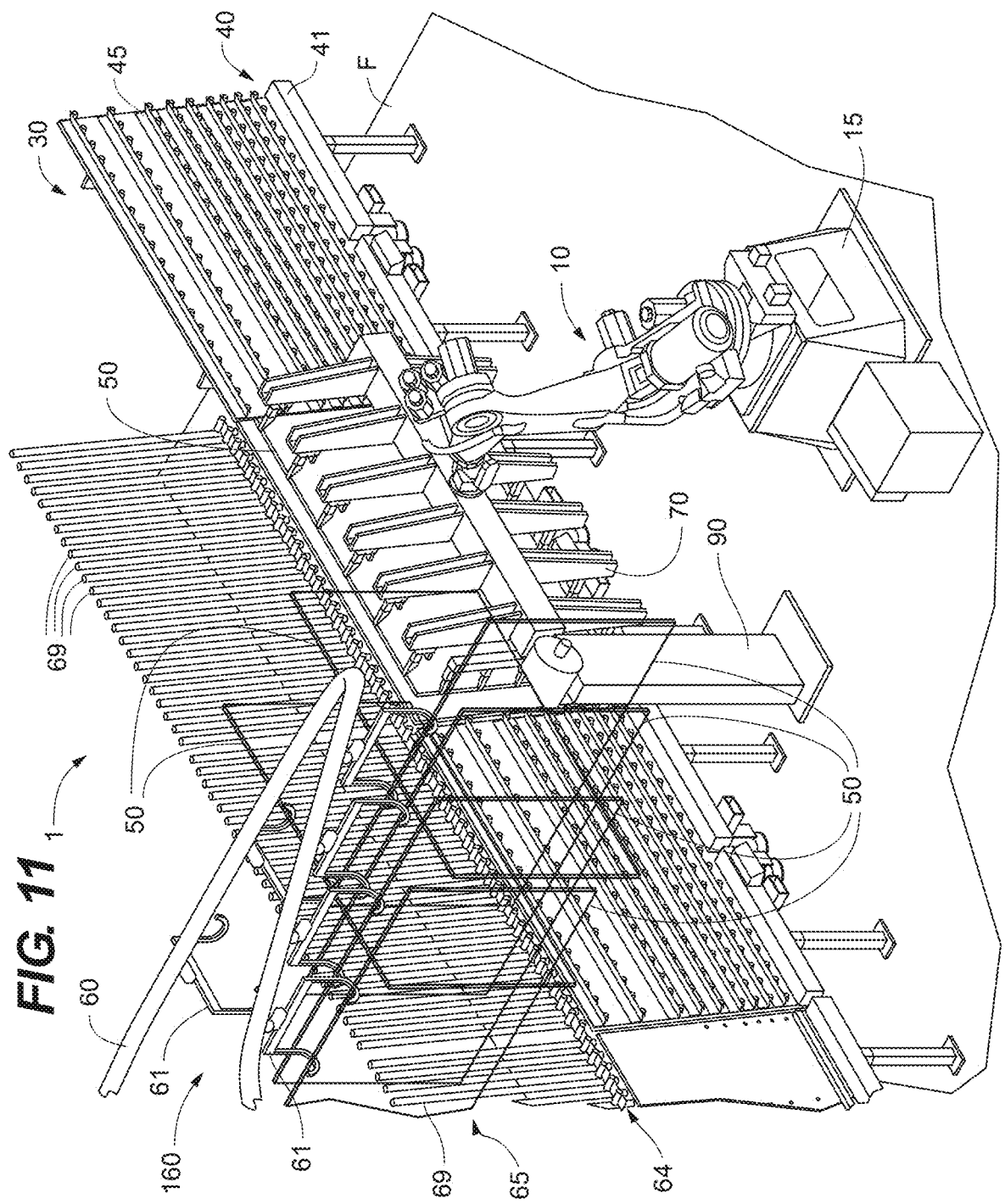
FIG. 11 is yet another perspective view of the robotic spacer processing system of FIG. 1, with the first robot arm shown in another second position.
Figure 12:
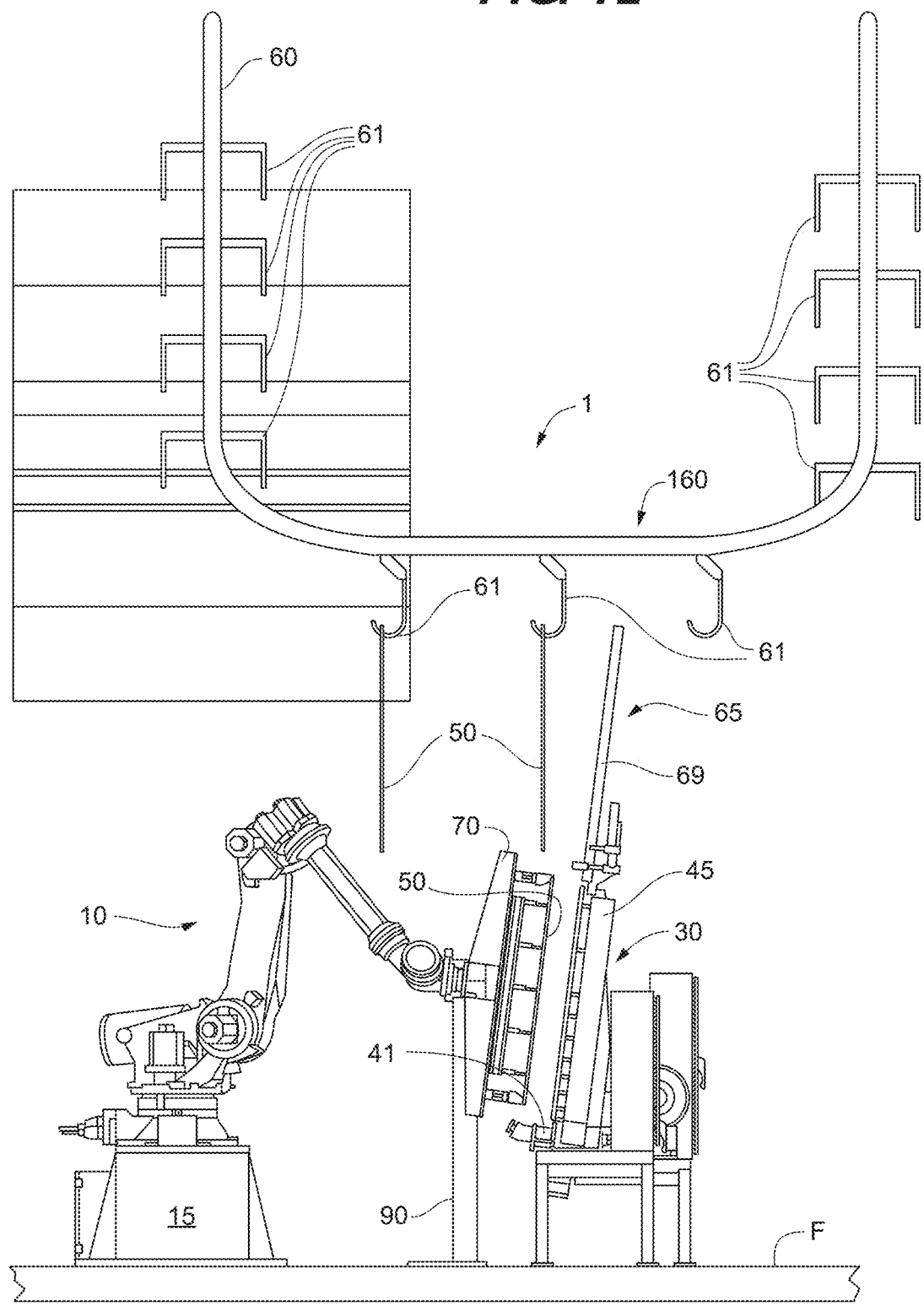
FIG. 12 is an end view of the spacer processing system of FIG. 11.
Figure 13:
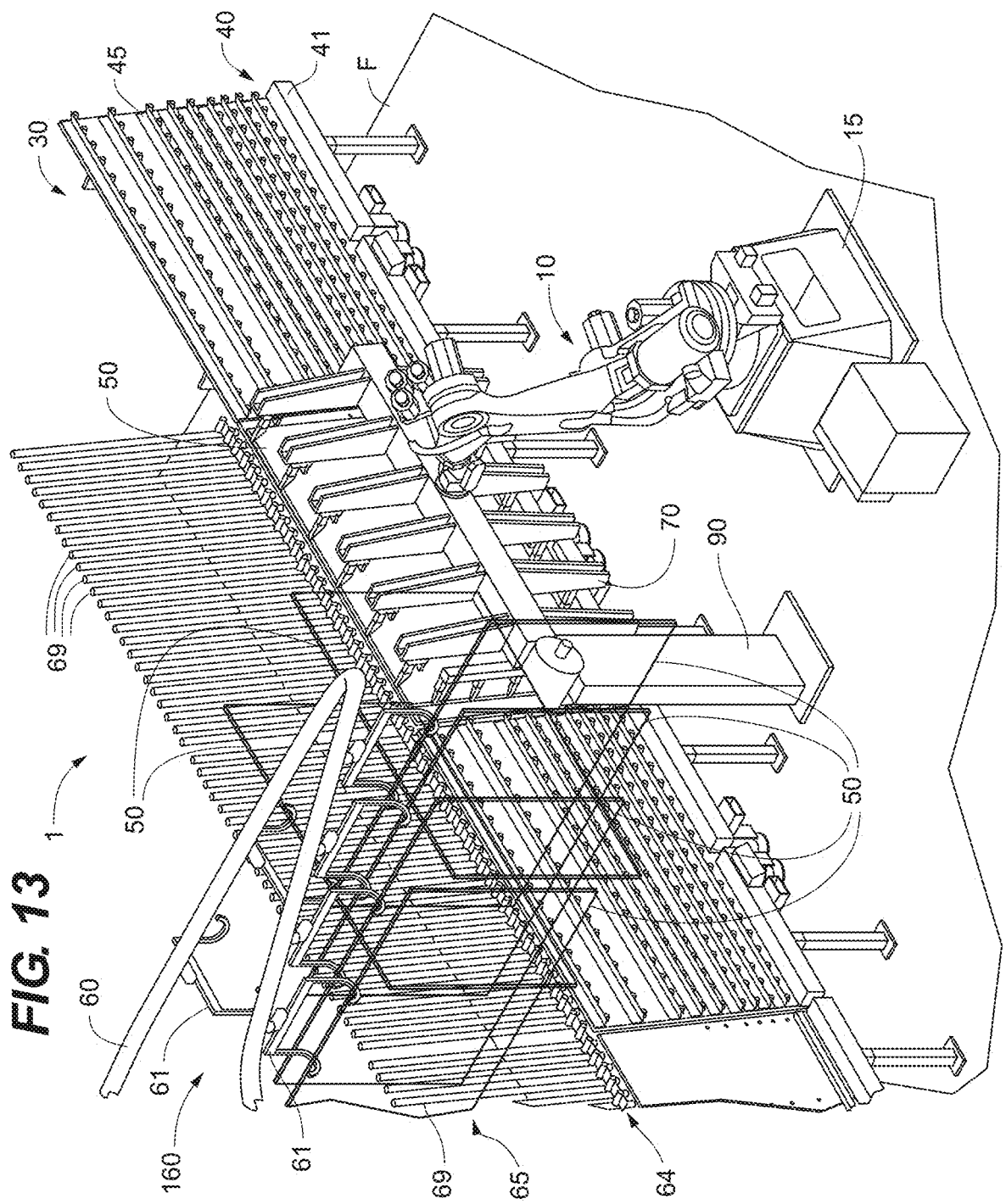
FIG. 13 is still another perspective view of the robotic spacer processing system of FIG. 1, with the first robot arm shown in an adhering position.
Figure 14:
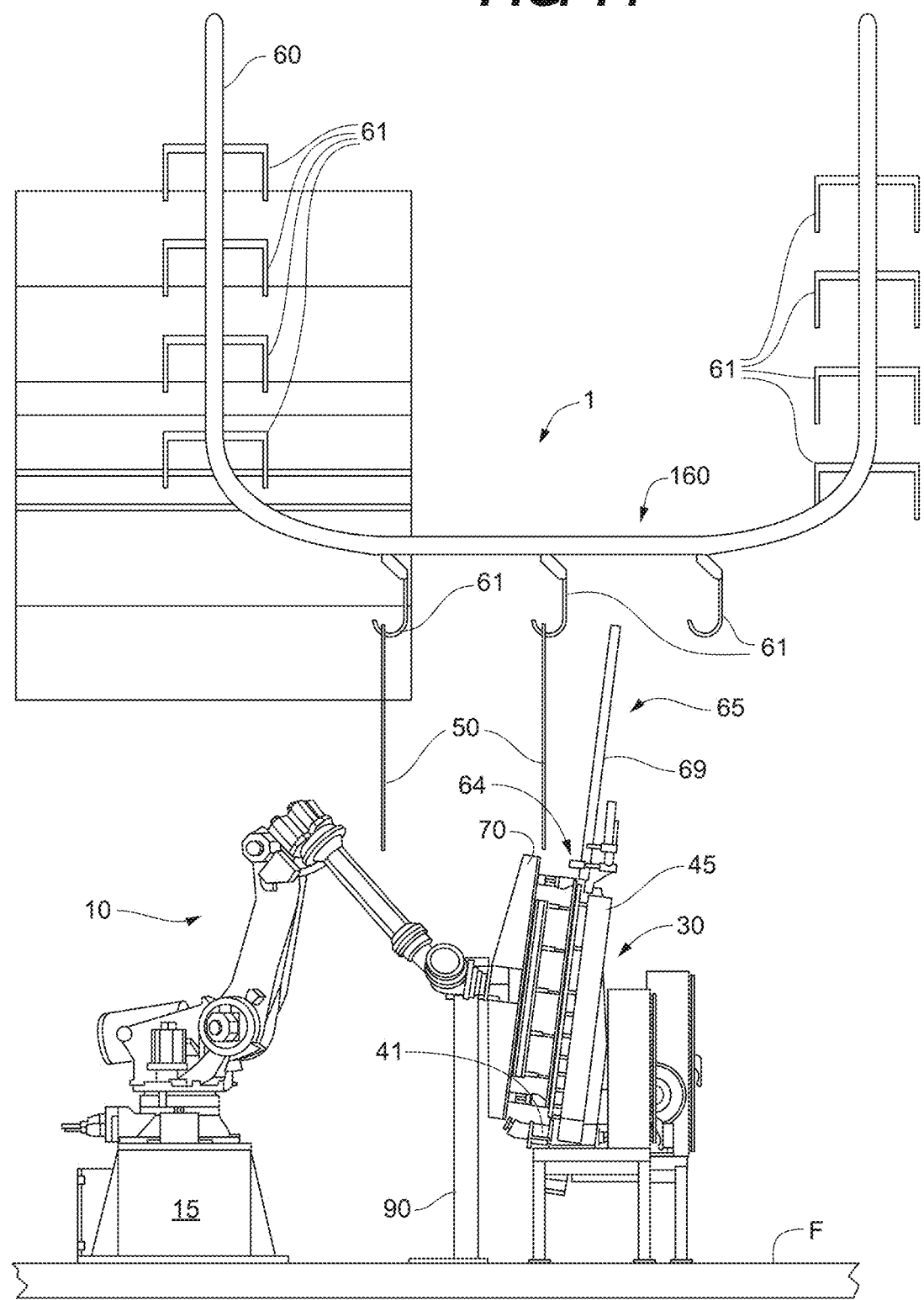
FIG. 14 is an end view of the spacer processing system of FIG. 13.
Figure 15:
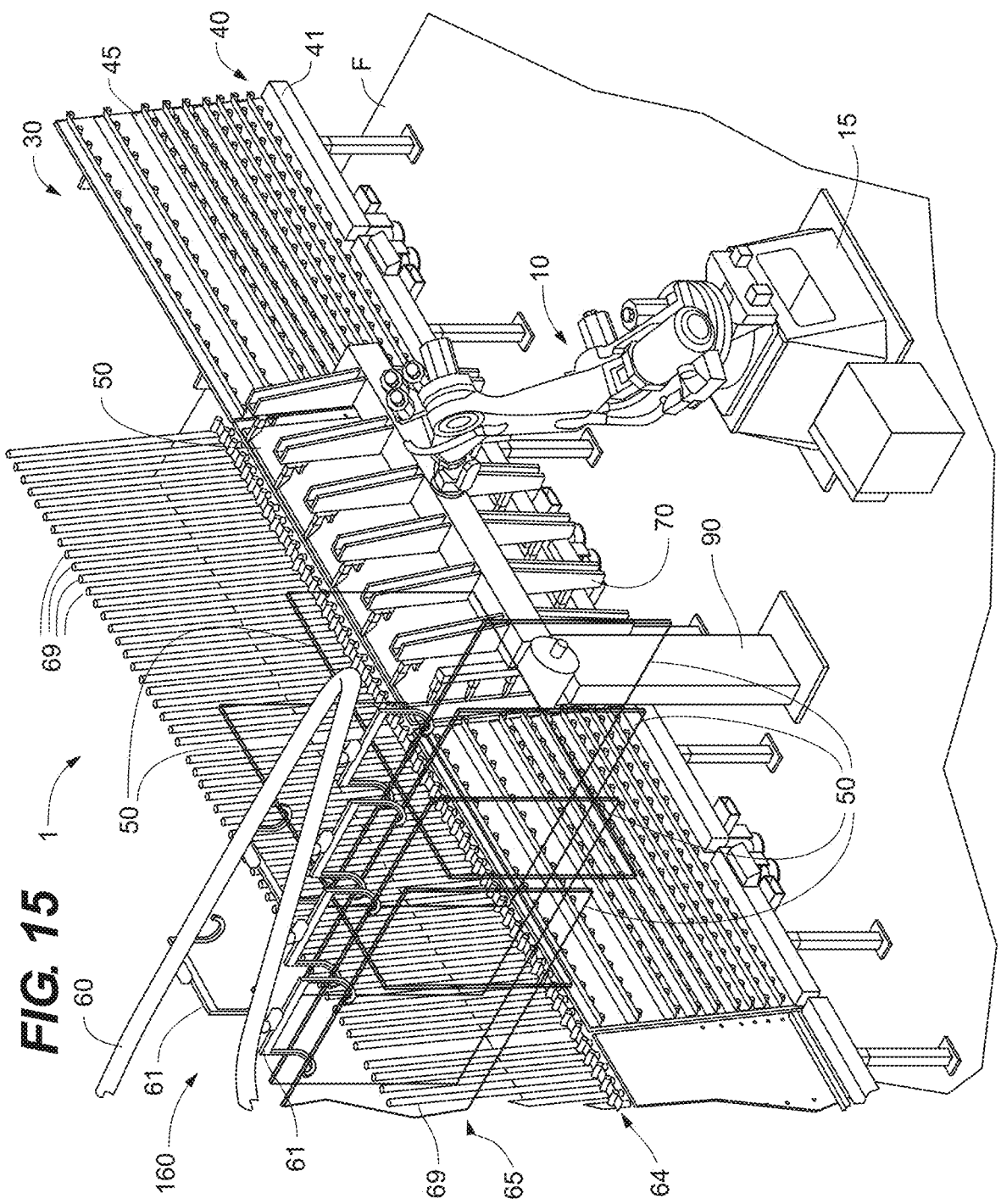
FIG. 15 is yet another perspective view of the robotic spacer processing system of FIG. 1, with the first robot arm shown in a retracting position.
Figure 16:
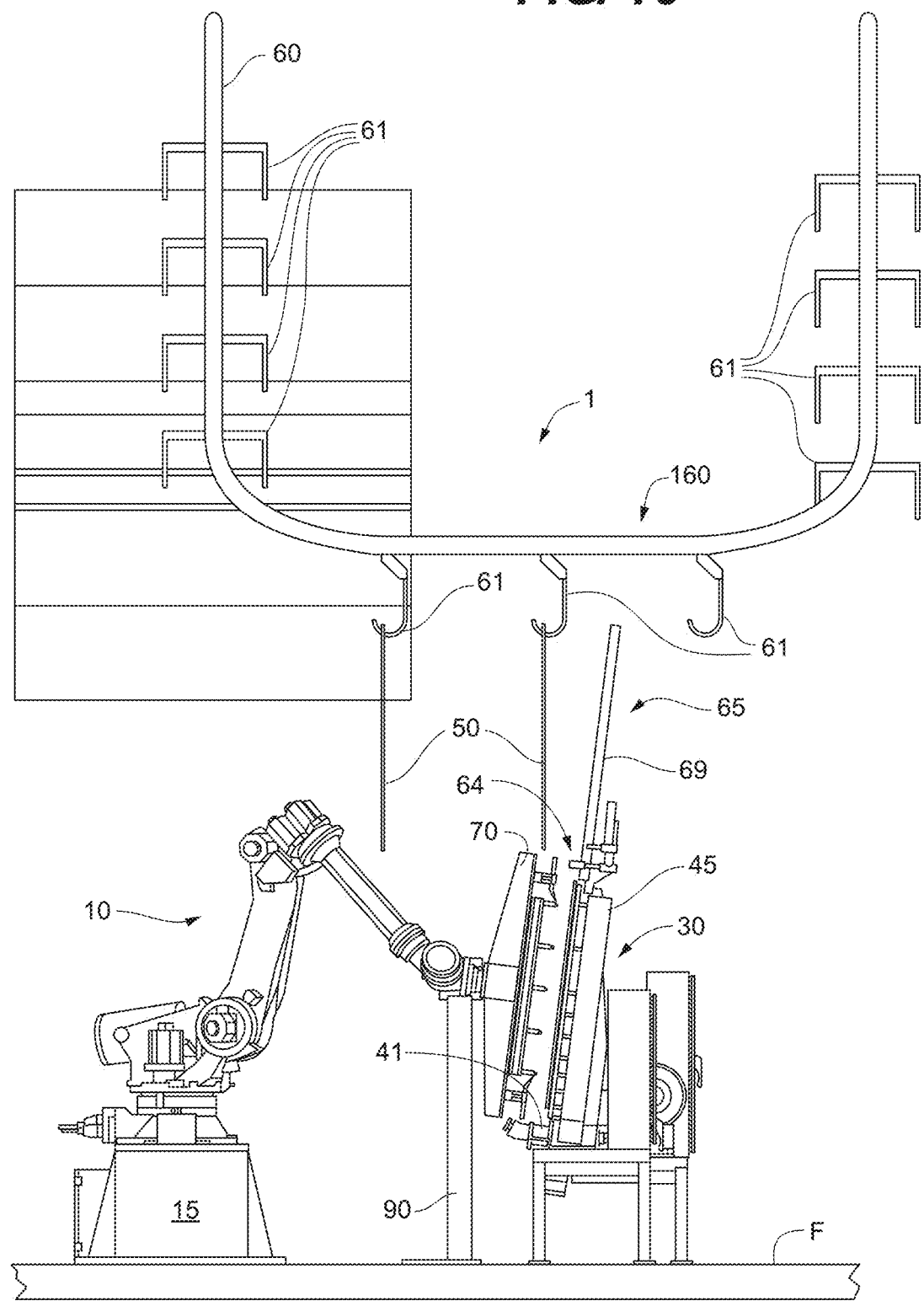
FIG. 16 is an end view of the spacer processing system of FIG. 15.

In the present embodiments, the robotic spacer processing system 1 has first and second positions. The robotic spacer processing system 1 when in the first position has the first gripper frame 70 holding a spacer 50 adjacent the spacer conveyor line 65. Reference is made to FIGS. 3 and 4. Here, the first robot arm 10 has the first gripper frame 70 in an elevated orientation (e.g., above the IG line) when the system 1 is in the first position. This, however, is not required. For example, the spacer conveyor line can alternatively be at the same level as, or a lower level than, the IG line.

The robotic spacer processing system 1 when in the second position has the first gripper frame 70 holding the spacer 50 adjacent the insulating glazing unit assembly line 30. Reference is made to FIGS. 9-12. Here, the first robot arm 10 holds the first gripper frame 70 in a lowered orientation (e.g., relative to the elevated orientation noted above) when the system 1 is in the first position. However, this is not required either. When in the second position, the system 1 is configured to press the spacer 50 against (and thereby adhere the spacer to) a pane 200 on the IG line 30.

Preferably, the robotic spacer processing system 1 also has a start position, and when in the start position, the first robot arm 10 is configured to remove the spacer 50 from the spacer conveyor line 65 and thereafter rotate the spacer about multiple axes. Reference is made to FIGS. 1 and 2. As will be appreciated, the system 1 will be in the start position before moving to the first position. When in the start position, a plurality of activated grippers 75 on the first gripper frame 70 preferably are in an open position, so as to be ready to grip a spacer 50 on the spacer conveyor line 65.

As noted above, the first robot arm 10 having the first gripper frame 70 can be incorporated into various different embodiments of the robotic spacer processing system 1. In some embodiments, the system 1 also includes a sealant applicator 90. When provided, the sealant applicator 90 is located adjacent the first robot arm 10. In such embodiments, the first robot arm 10 with the first gripper frame 70 is configured to hold a spacer 50 at the sealant applicator 90. This is a sealing position, and/or an intermediate position, of the robotic spacer processing system 1. Thus, the system 1 when in the sealing position has the first gripper frame 70 holding the spacer 50 at the sealant applicator 90.

When the system 1 is in the sealing position, the sealant applicator 90 is configured to apply sealant along at least one side (preferably along opposed sides) of the spacer 50 held by the first gripper frame 70. The applied sealant preferably is a bead of sealant extending along a length (preferably extending continuously along the entire length) of the spacer 50. In more detail, the first robot arm 10 preferably is configured to move the spacer 50 along a nozzle of the sealant applicator station 90, so as to apply a bead of sealant along a length of the spacer. In cases where the spacer is rectangular, the bead preferably is applied along all four legs of the spacer.

In the embodiments illustrated, the sealant applicator 90 is a standalone station that is spaced apart from IG line 30. The sealant applicator 90 preferably includes (e.g., is adapted to dispense) a supply of sealant, such as PIB or another suitable primary sealant material.

In certain embodiments involving a sealant applicator, the system is simply configured to process spacers through the sealant applicator, i.e., so as to apply sealant to them, without using the robot arm to subsequently apply the spacer to a pane.

In other embodiments, the robotic spacer processing system 1 further includes an insulating glazing unit assembly line 30 and a spacer conveyor system 160. In such cases, the sealant applicator 90 is located adjacent both the IG line 30 and the spacer conveyor system 160, in addition to being located adjacent the first robot arm 10. In embodiments of this nature, the sealant applicator 90 preferably is a stand-alone station (e.g., a PIB pedestal) that is spaced apart from IG line 30, the spacer conveyor system 160, and the first robot arm 10.

In the present embodiments, the first robot arm 10 with the first gripper frame 70 is configured to remove a spacer 50 from the spacer conveyor line 65, move that spacer to the sealant applicator 90 where sealant is applied to the spacer, then move the resulting sealant-bearing spacer to the IG line 30, and press the spacer against a pane 200 on the IG line. In doing so, sealant on the spacer adheres to the pane, thus securing the spacer to the pane. Reference is made to FIGS. 1-14.

Thus, in certain preferred embodiments, the robotic spacer processing system 1 includes the first robot arm 10, an insulating glazing unit assembly line 30, a spacer conveyor system 160, and a sealant applicator 90. This is exemplified by the non-limiting embodiment shown in FIGS. 1-16.

Figure 17A:
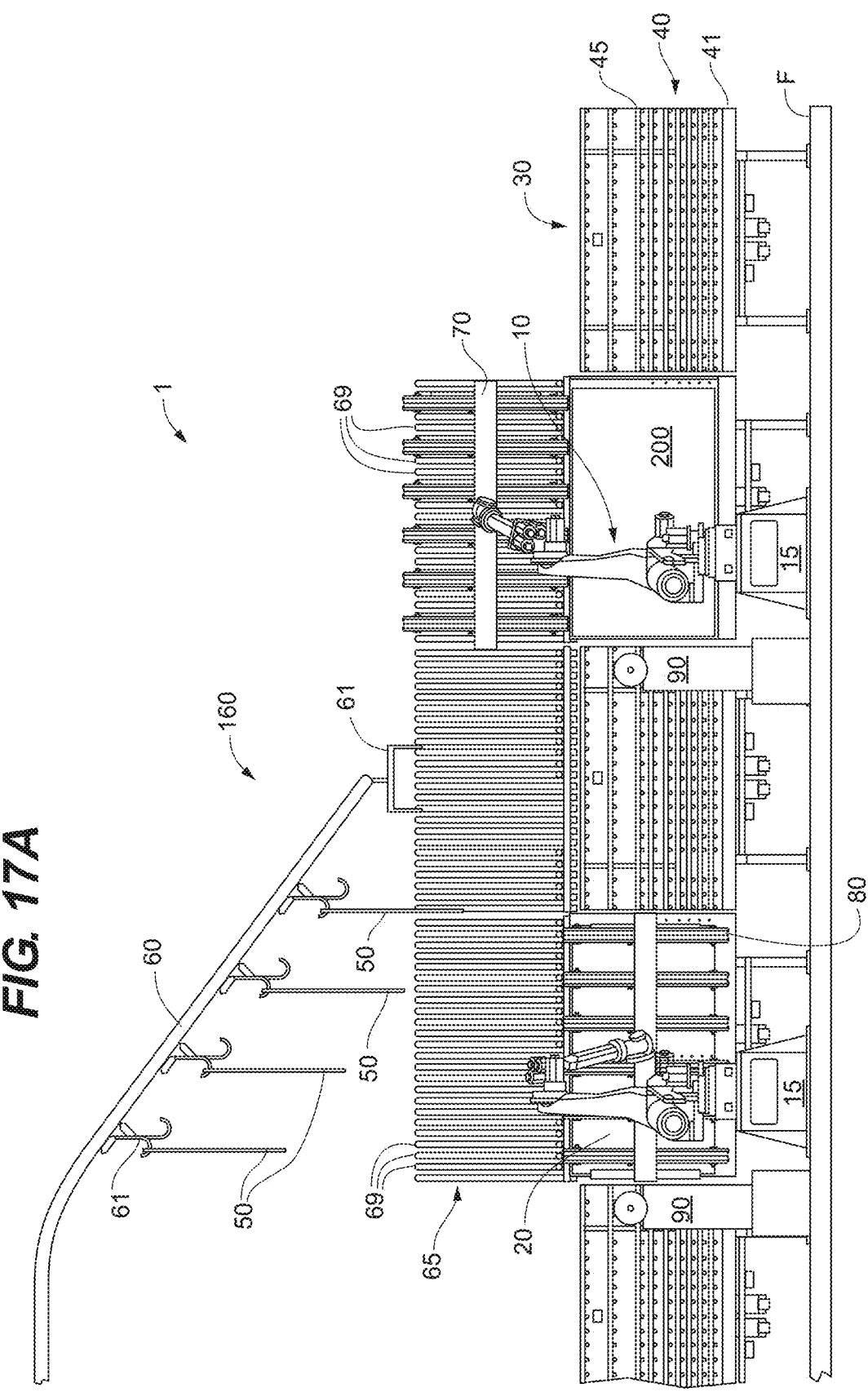
FIG. 17A is a side view of a robotic spacer processing system in accordance with certain embodiments of the invention where the system includes two robot arms.
Figure 17B:
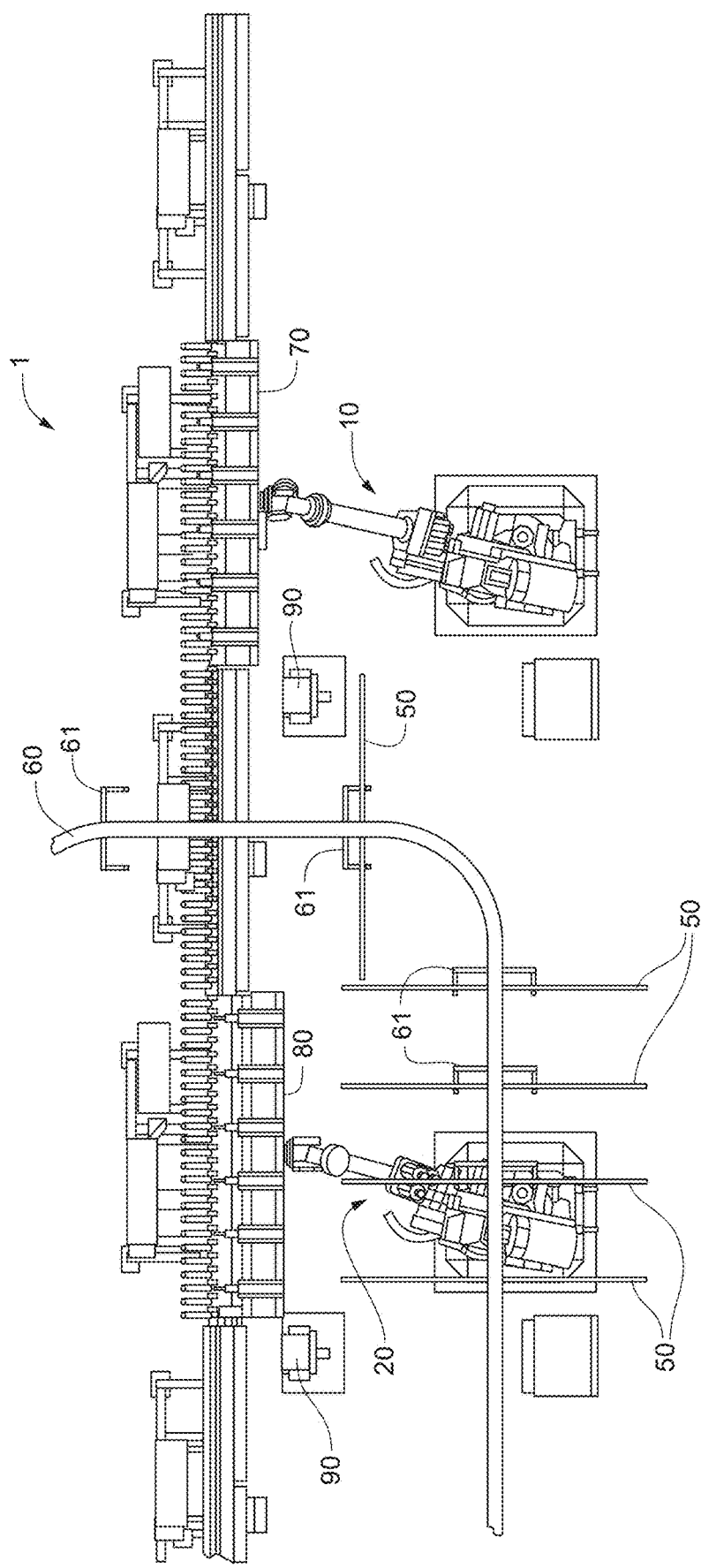
FIG. 17B is a top view of the robotic spacer processing system of FIG. 17A.
Figure 17C:
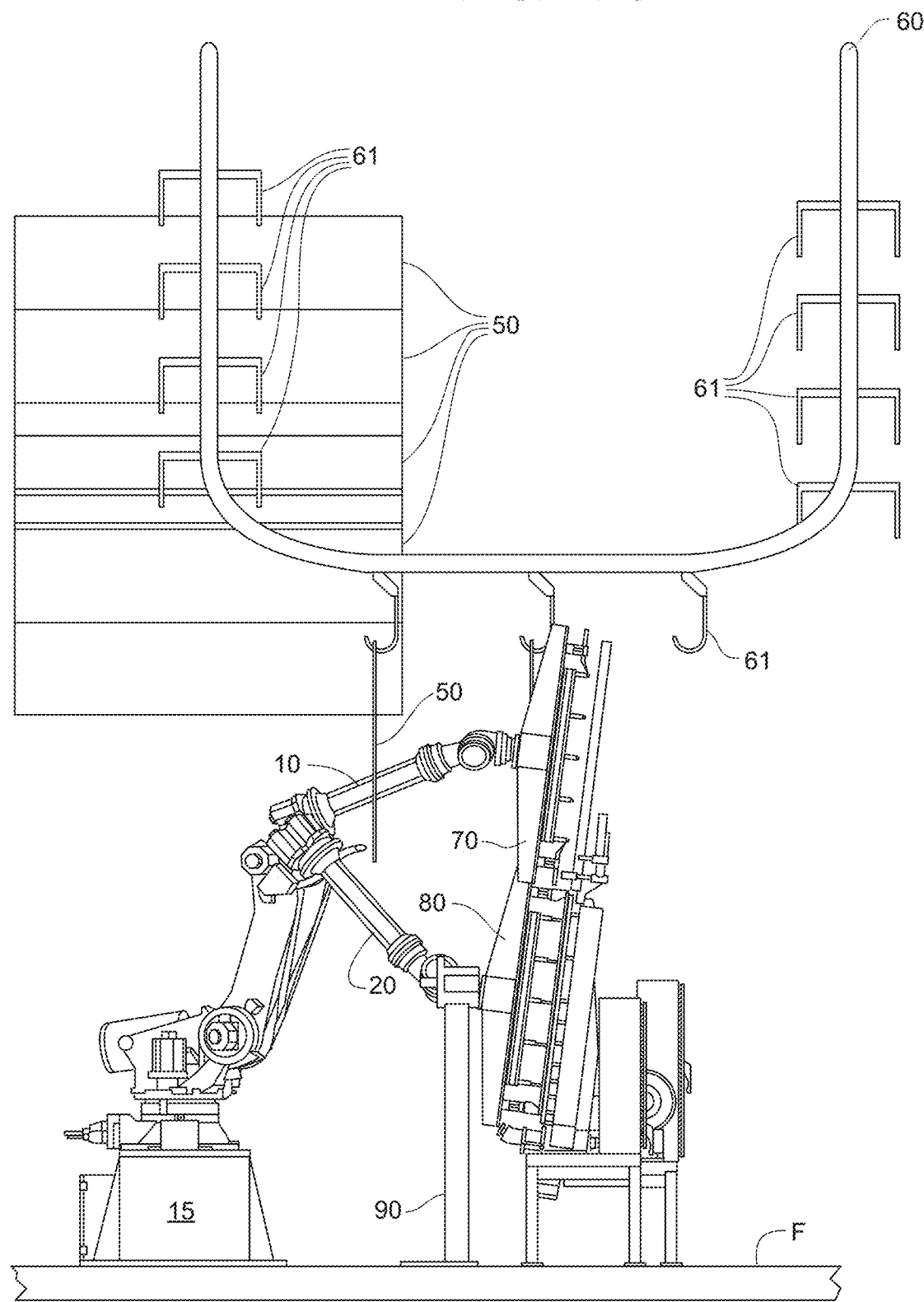
FIG. 17C is an end view of the robotic spacer processing system of FIG. 17A.

Furthermore, some embodiments provide first 10 and second 20 robot arms respectively having first 70 and second 80 gripper frames. Reference is made to FIGS. 17A, 17B, and 17C. In the present embodiments, each of the two robot arms 10, 20 can optionally be of the nature described above. For example, they can each have multiple axes of rotation, i.e., each can be a multi-axis robot arm. Preferably, each such robot arm has four or more (e.g., six) axes of rotation. Thus, the first 10 and second 20 robot arms in the present embodiments can each be of the nature described above for the first robot arm (e.g., for features described above as being for the "first robot arm," each such description should be understood to be copied, modified by referring instead to the "second robot arm," and incorporated as part of the present paragraph). The same is true of the previous descriptions of the first gripper frame 70 relative to the second gripper frame 80. In some cases, both robot arms 10, 20 are the same robot model, such as model number R2000iC/165 from Fanuc. In other cases, the two robot arms are different robot models. Furthermore, the gripper frames 70, 80 on the two robot arms 10, 20 can be the same or different. When two robot arms are provided, they typically will be the same robot models and will carry the same types of gripper frames. This, however, is not required.

Thus, FIGS. 17A, 17B, and 17C show a non-limiting example of a robotic spacer processing system 1 that includes first 10 and second 20 robot arms. As best seen in FIGS. 17A and 17B, the first 10 and second 20 robot arms are positioned at spaced apart locations alongside the IG line 30. Here, both robot arms 10, 20 are on the same side of the IG line.

In the illustrated embodiment, the system 1 also has a spacer conveyor system 160 comprising a spacer conveyor line 65 and an optional overhead conveyor 60. If desired, the overhead conveyor can be omitted, and the spacers can simply be conveyed along a modified version of the illustrated spacer conveyor line. In such cases, the modified spacer conveyor line itself can be configured to bring spacers to the working area. Alternative arrangements of this nature can be provided whether the system has one or two robot arms.

In the embodiment illustrated, the overhead conveyor 60 delineates a spacer path that passes in a crosswise (e.g., substantially perpendicular) manner through the spacer conveyor line 65. The nature of such an intersection has already been described with respect to FIGS. 1-16. That prior description also applies to the present intersection, which is shown in FIGS. 17A, 17B, and 17C. As is perhaps best seen in FIG. 17B, the two robots 10, 20 are located on opposite sides of a desired length (e.g., a delivery section) of the illustrated overhead conveyor 60. This, however, is by no means required.

In more detail, the illustrated spacer conveyor line 65 has a transfer region located between (e.g., directly between) first and second staging areas. The first 10 and second 20 robot arms are respectively located adjacent the first and second staging areas of the spacer conveyor line 65. Thus, when the system 1 is in a first start position, the first robot arm 10 has the first gripper frame 70 adjacent a spacer 50 on the first staging area of the spacer conveyor line 65. With the system 1 in this position, the first robot arm 10 is ready to pick (e.g., has a plurality of grippers in an open position) the adjacent spacer 50 off the spacer conveyor line 65. Further, when the system 1 is in a second start position, the second robot arm 20 has the second gripper frame 80 adjacent a spacer 50 on the second staging area of the spacer conveyor line 65. With the system 1 in this position, the second robot arm 20 is ready to pick (e.g., has a plurality of grippers in an open position) the adjacent spacer 50 off the spacer conveyor line 65.

Subsequently, when the system 1 is in a first pressing position, the first robot arm 10 has the first gripper frame 70 holding a spacer 50 adjacent a pane 200 on the IG line 30. With the system 1 in this position, the first robot arm 10 is ready to press the spacer 50 held by the first gripper frame 70 against the adjacent pane 200 on the IG line 30. When that spacer 50 is then pressed against the pane 200, sealant on the spacer adheres it to the pane.

Similarly, when the system 1 is in a second pressing position, the second robot arm 20 has the second gripper frame 80 holding a spacer 50 adjacent a pane 200 on the IG line 30. With the system 1 in this position, the second robot arm 20 is ready to press the spacer 50 held by the second gripper frame 80 against the adjacent pane 200 on the IG line 30. When that spacer 50 is then pressed against the pane 200, sealant on the spacer adheres it to the pane.

As will be appreciated, the system 1 will be in the first start position before moving to the first pressing position. When in the first start position, a plurality of activated grippers 75 on the first gripper frame 70 preferably are in an open position, so as to be ready to grip the adjacent spacer 50 on the spacer conveyor line 65. Likewise, the system 1 will be in the second start position before moving to the second pressing position. When in the second start position, a plurality of activated grippers on the second gripper frame 80 preferably are in an open position, so as to be ready to grip the adjacent spacer 50 on the spacer conveyor line 65.

Furthermore, in the embodiment shown in FIGS. 17A, 17B, and 17C, the system 1 includes two sealant applicators 90. One of the sealant applicators 90 is adjacent (e.g., positioned for use by) the first robot arm 10, and the other sealant applicator 90 is adjacent (e.g., positioned for use by) the second robot arm 20.

In the embodiment illustrated, the two sealant applicators 90 are located on opposite sides of a section (delivery section) of the overhead conveyor 60. This is best shown in the top view of FIG. 17B. It is to be appreciated, however, that this is not required; the sealant applicators can be provided at various different locations.

In FIGS. 17A, 17B, and 17C, the illustrated sealant applicators 90 are standalone applicators (e.g., PIB pedestals), which are spaced apart from the IG line 30. These details, however, are not required.

In the embodiment shown in FIGS. 17A, 17B, and 17C, the system 1 has a first intermediate position (or "first sealing position") characterized by the first gripper frame 70 holding a spacer 50 adjacent a first sealant applicator 90. When the system 1 is in the first sealing position, the first sealant applicator 90 is configured to apply sealant along at least one side (preferably along opposed sides) of the spacer 50 held by the first gripper frame 70.

With continued reference to FIGS. 17A, 17B, and 17C, the illustrated system 1 also has a second intermediate position (or "second sealing position"), which is characterized by the second gripper frame 80 holding a spacer 50 adjacent a second sealant applicator 90. When the system 1 is in the second sealing position, the second sealant applicator 90 is configured to apply sealant along at least one side (preferably along opposed sides) of the spacer 50 held by the second gripper frame 80.

As will be appreciated, the illustrated system 1 will be in the first sealing position after moving from the first start position and before moving to the first pressing position. Likewise, the illustrated system 1 will be in the second sealing position after moving from the second start position and before moving to the second pressing position.

Various examples have been described. These and other examples are within the scope of the following claims.

The invention claimed is:

1. A robotic spacer processing system comprising an insulating glazing unit assembly line, a spacer conveyor system, and a first robot arm, the spacer conveyor system including a spacer conveyor line along which spacers can be conveyed, the first robot arm being equipped with a first gripper frame, the robotic spacer processing system having first and second positions, the robotic spacer processing system when in the first position having the first gripper frame holding a spacer adjacent the spacer conveyor line, the robotic spacer processing system when in the second position having the first gripper frame holding the spacer adjacent the insulating glazing unit assembly line, wherein the first gripper frame comprises a plurality of grippers that are each configured to grip a spacer, wherein at least some of the grippers are adjustable grippers such that the first gripper frame is configured to hold spacers of different sizes, different shapes, or both, the first gripper frame comprising a plurality of tracks along which respective ones of the adjustable grippers are movable to different positions, the tracks extending along a height of the first gripper frame, the first gripper frame comprising a plurality of frame members that are spaced apart from one another and substantially parallel to one another, the frame members defining the tracks, and the first gripper frame further including a line of grippers that are spaced apart from one another along the height of the first gripper frame, the line of grippers being moveable along a width of the first gripper frame such that the line of grippers can be positioned between any desired two of the frame members, and each of the adjustable grippers is moveable individually along a respective one of the tracks whereas the line of grippers is moveable as a unit along the width of the first gripper frame.

2. The robotic spacer processing system of claim 1 wherein the robotic spacer processing system when in the second position is configured to adhere the spacer to a glass sheet on the insulating glazing unit assembly line.

3. The robotic spacer processing system of claim 1 wherein the robotic spacer processing system also has a start position, and when the robotic spacer processing system is in the start position the first robot arm is configured to remove the spacer from the spacer conveyor line and thereafter rotate the spacer about multiple axes.

4. The robotic spacer processing system of claim 1 wherein the first robot arm comprises a mount base that is mounted to a floor at a location spaced apart from the insulating glazing unit assembly line.

5. The robotic spacer processing system of claim 1 wherein the spacer conveyor line is located above the insulating glazing unit assembly line.

6. The robotic spacer processing system of claim 1 wherein the spacer delineates a rectangular shape and comprises four legs, the first gripper frame configured to simultaneously grip all four legs of the spacer.

7. The robotic spacer processing system of claim 1 further comprising a sealant applicator, the robotic spacer processing system having an intermediate position, the robotic spacer processing system when in the intermediate position having the first gripper frame holding the spacer adjacent the sealant applicator.

8. The robotic spacer processing system of claim 7 wherein the robotic spacer processing system when in the intermediate position is configured to apply sealant onto opposed sides of the spacer.

9. The robotic spacer processing system of claim 1 wherein the line of grippers that is moveable along the width of the first gripper frame is adjustable along a track that is perpendicular to the tracks extending along the height of the first gripper frame.

10. The robotic spacer processing system of claim 1 wherein the line of grippers that is moveable along the width of the first gripper frame is slidably actuatable by a servo motor.

11. The robotic spacer processing system of claim 1 wherein the first gripper frame includes a crossbeam that is crosswise to the frame members, and the crossbeam is attached to a working end of the first robot arm.

12. The robotic spacer processing system of claim 1 wherein on each of the tracks there are mounted two of the grippers including one of the adjustable grippers.

13. A robotic spacer processing system comprising an insulating glazing unit assembly line, a spacer conveyor system, and a first robot arm, the spacer conveyor system including a spacer conveyor line along which spacers can be conveyed, the first robot arm being equipped with a first gripper frame, the robotic spacer processing system having first and second positions, the robotic spacer processing system when in the first position having the first gripper frame holding a spacer adjacent the spacer conveyor line, the robotic spacer processing system when in the second position having the first gripper frame holding the spacer adjacent the insulating glazing unit assembly line, wherein the first gripper frame comprises a plurality of grippers that are each configured to grip a spacer, wherein the spacer conveyor line is located above the insulating glazing unit assembly line, and wherein the spacer conveyor system further includes an overhead conveyor, and the overhead conveyor is located above the spacer conveyor line.

14. The robotic spacer processing system of claim 13 wherein the overhead conveyor delineates a spacer path, and at least a certain length of the spacer path is crosswise to the spacer conveyor line.

15. The robotic spacer processing system of claim 13 wherein the overhead conveyor comprises a plurality of hooks configured to respectively retain a plurality of spacers such that the spacers hang downwardly from the hooks.

16. The robotic spacer processing system of claim 15 wherein each of the hooks comprises a pair of hook arms, each pair of hook arms configured to retain a spacer in a hanging position therefrom.

17. The robotic spacer processing system of claim 14 further comprising a second robot arm, the first and second robot arms respectively comprising first and second mount bases that are each mounted to a floor, the first and second mount bases located on opposite sides of at least a certain length of the spacer path, the first and second robot arms each having multiple axes of rotation, including a vertical axis of rotation.

18. The robotic spacer processing system of claim 13 wherein the first gripper frame comprises a plurality of frame members, the frame members being spaced apart from one another and substantially parallel to one another.

19. The robotic spacer processing system of claim 13 wherein the overhead conveyor delineates a spacer path, and part of the spacer path intersects the spacer conveyor line, such that a spacer conveyed by the overhead conveyor will reach a region of intersection with the spacer conveyor line, and upon reaching that region of intersection will contact spaced-apart upright members of the spacer conveyor line, thereby causing the spacer to drop onto a transfer region of the spacer conveyor line.

20. The robotic spacer processing system of claim 19 wherein the spacer conveyor line includes a spacer staging area where a spacer is to be positioned for the first gripper frame to pick it off the spacer conveyor line, the transfer region of the spacer conveyor line being upstream of the spacer staging area of the spacer conveyor line.

21. The robotic spacer processing system of claim 13 wherein the spacer conveyor line includes a bottom conveyor configured to support a bottom leg of the spacer.

22. A robotic spacer processing system comprising an insulating glazing unit assembly line, a spacer conveyor system, a sealant applicator, and a first robot arm, the spacer conveyor system comprising a spacer conveyor line along which spacers can be conveyed, the first robot arm being equipped with a first gripper frame, the spacer conveyor line being at a higher elevation than the insulating glazing unit assembly line, such that the spacer conveyor line is directly above the insulating glazing unit assembly line, the spacer conveyor line having a staging area where a spacer is to be positioned for the first gripper frame to pick the spacer off the spacer conveyor line, and the insulating glazing unit assembly line having a processing area where the spacer is subsequently pressed against, and thereby adhered to, a pane when the pane is so positioned on the insulating glazing unit assembly line, the staging area of the spacer conveyor line being directly above the processing area of the insulating glazing unit assembly line, the spacer conveyor line including a bottom conveyor configured to support a bottom leg of the spacer, the robotic spacer processing system having a first position, an intermediate position, and a second position, the robotic spacer processing system when in the first position having the first gripper frame holding a spacer adjacent the spacer conveyor line, the robotic spacer processing system when in the intermediate position having the first gripper frame holding the spacer adjacent the sealant applicator, the robotic spacer processing system when in the second position having the first gripper frame holding the spacer adjacent the insulating glazing unit assembly line.

23. The robotic spacer processing system of claim 22 wherein the robotic spacer processing system when in the intermediate position is configured to apply sealant onto opposed sides of the spacer, and the robotic spacer processing system when in the second position is configured to adhere the spacer to a pane on the insulating glazing unit assembly line.

24. The robotic spacer processing system of claim 23 wherein the robotic spacer processing system also has a start position, and when the robotic spacer processing system is in the start position the first robot arm is configured to remove the spacer from the spacer conveyor line and thereafter rotate the spacer about multiple axes.

25. The robotic spacer processing system of claim 22 wherein the spacer conveyor system further includes an overhead conveyor, and the overhead conveyor is located above the first robot arm.

26. The robotic spacer processing system of claim 25 wherein the first robot arm comprises a mount base that is mounted to a floor.

27. The robotic spacer processing system of claim 22 further comprising a second robot arm, the first and second robot arms each having six axes of rotation.

28. The robotic spacer processing system of claim 25 wherein the overhead conveyor comprises a plurality of hooks configured to respectively retain a plurality of spacers such that the spacers hang downwardly from the hooks.

29. The robotic spacer processing system of claim 22 wherein the spacer delineates a rectangular shape and comprises four legs, the first gripper frame configured to simultaneously grip all four legs of the spacer.

30. The robotic spacer processing system of claim 22 wherein the first gripper frame comprises a plurality of grippers that are each configured to grip a spacer.

31. The robotic spacer processing system of claim 30 wherein at least some of the grippers are adjustable grippers such that the first gripper frame is configured to hold spacers of different sizes, different shapes, or both.

32. The robotic spacer processing system of claim 31 wherein the first gripper frame comprises a plurality of tracks along which respective ones of the adjustable grippers are movable to different positions, the tracks extending along a height of the first gripper frame, the first gripper frame comprising a plurality of frame members that are spaced apart from one another and substantially parallel to one another, the frame members defining the tracks, and the first gripper frame further including a line of grippers that are spaced apart from one another along the height of the first gripper frame, the line of grippers being moveable along a width of the first gripper frame such that the line of grippers can be positioned between any desired two of the frame members, and each of the adjustable grippers is moveable individually along a respective one of the tracks whereas the line of grippers is moveable as a unit along the width of the first gripper frame.

33. The robotic spacer processing system of claim 22 wherein the spacer conveyor system further includes an overhead conveyor, wherein the sealant applicator is one of two sealant applicators of the robotic spacer processing system, and wherein the two sealant applicators are located on opposite sides of a section of the overhead conveyor.

34. The robotic spacer processing system of claim 27 wherein the staging area of the spacer conveyor line is one of two staging areas of the spacer conveyor line, and wherein the first and second robot arms are respectively located adjacent the two staging areas of the spacer conveyor line.

* * * * *